US012425560B2

(12) United States Patent
Imai

(10) Patent No.: US 12,425,560 B2
(45) Date of Patent: Sep. 23, 2025

(54) SYSTEM AND METHOD

(71) Applicant: CANON KABUSHIKI KAISHA, Tokyo (JP)

(72) Inventor: Yasuhiro Imai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 18/347,909

(22) Filed: Jul. 6, 2023

(65) Prior Publication Data

US 2024/0040105 A1 Feb. 1, 2024

(30) Foreign Application Priority Data

Jul. 28, 2022 (JP) ................................ 2022-120790

(51) Int. Cl.
*G06T 19/00* (2011.01)
*H04N 13/279* (2018.01)

(52) U.S. Cl.
CPC ......... *H04N 13/279* (2018.05); *G06T 19/006* (2013.01)

(58) Field of Classification Search
None
See application file for complete search history.

(56) References Cited

U.S. PATENT DOCUMENTS 10,591,986 B2 3/2020 Sugaya
2018/0321817 A1* 11/2018 Terahata ................ G06F 3/011
2020/0033936 A1 1/2020 Sugaya

FOREIGN PATENT DOCUMENTS

JP 2016-071900 A 5/2016
JP 6244069 B1 12/2017

* cited by examiner

*Primary Examiner* — Robert J Craddock
(74) *Attorney, Agent, or Firm* — Venable LLP

(57) ABSTRACT

A system that manages a virtual object includes: a management means configured to manage viewpoint information of a user of a first terminal for a virtual object which is provided using the first terminal and which is projected in the first terminal for the user of the first terminal; and a provision means configured to provide information of the virtual object to be projected in a second terminal in response to a feature quantity in the real world for displaying the virtual object in correlation with the real world which is detected by the second terminal. Control for switching between projection of the virtual object corresponding to a viewpoint of the user of the first terminal and projection of the virtual object corresponding to a viewpoint other than the viewpoint using the managed viewpoint information on the basis of an instruction for projection of the virtual object is performed in the second terminal.

9 Claims, 38 Drawing Sheets

FIG. 4

Anchor information

| Anchor ID | Session ID | Virtual object data | Feature quantity | Virtual object position information | Sensor information | Owner | Operator | Viewpoint synchronization object | Viewpoint position information |
|---|---|---|---|---|---|---|---|---|---|
| anchor001 | Session001 | object1.obj | feature1.dat | (1,23,31) | Beacon:123 | UserA | UserA | - | - |
| anchor002 | Session002 | object2.obj | feature2.dat | (1,3,22) | Wifi:345 | UserE | UserF | - | - |
| anchor003 | Session003 | object3.obj | feature3.dat | (25,3,41) | Beacon:123 | UserX | UserY | - | - |
| anchor004 | Session004 | object4.obj | feature4.dat | (22,12,21) | Wifi:345 | User001 | User001 | ○ | (-3,-9,-10) |
| anchor005 | Session005 | object5.obj | feature5.dat | (80,9,20) | Beacon:123 | User011 | - | - | - |
| anchor006 | Session005 | object6.obj | feature6.dat | (13,8,26) | Beacon:123 | User011 | User001 | ○ | (-10,-5,-50) |
| anchor007 | Session005 | object7.obj | feature7.dat | (16,10,19) | Beacon:123 | User011 | User012 | ○ | (-12,-5,-30) |
| anchor008 | Session006 | object8.obj | feature8.dat | (81,12,16) | Wifi:345 | User021 | User022 | ○ | (-5,-20,-15) |
| ... | ... | ... | ... | ... | ... | ... | ... | ... | ... |

FIG. 5

Session information

| Session ID | Session issuer | Login user | Presenter | Attendant | Presentation method | Control transfer method | Controller |
|---|---|---|---|---|---|---|---|
| Session001 | UserA | UserA, UserB | UserA | UserA, UserB | Image sharing | – | – |
| Session002 | UserG | UserF, UserG, UserH | UserE | UserF, UserG | Image sharing | Designation | UserF |
| Session003 | UserX | UserY, UserZ | UserX | UserY, UserZ | Image sharing | Automatic | UserY |
| Session004 | User001 | User002 | User001 | User001, User002 | Viewpoint synchronization | – | – |
| Session005 | User011 | User011, User012, User013, User014 | User011 | User011, User012, User013 | Viewpoint synchronization | Designation | User012 |
| Session006 | User023 | User022, User023 | User021 | User022, User023 | Viewpoint synchronization | Automatic | User022 |
| : | : | : | : | : | : | : | : |

FIG. 25

Session information

| Session ID | Copy source session | Session issuer | Login user | Presenter | Attendant | Presentation method | Control transfer method | Controller |
|---|---|---|---|---|---|---|---|---|
| Session001 | ~ | UserA | UserA, UserB | UserA | UserA, UserB | Image sharing | ~ | ~ |
| Session002 | ~ | UserG | UserF, UserG, UserH | UserE | UserF, UserG | Image sharing | Designation | UserF |
| Session003 | ~ | UserX | UserY, UserZ | UserX | UserY, UserZ | Image sharing | Automatic | UserY |
| Session004 | ~ | User001 | User002 | User001 | User001, User002 | ~ | ~ | ~ |
| Session005 | ~ | User011 | User011, User012, User013, User014 | User011 | User011, User012, User013 | ~ | Designation | User012 |
| Session006 | ~ | User023 | User022, User023 | User021 | User022, User023 | ~ | Automatic | User022 |
| : | : | : | : | : | : | : | : | : |
| Session011 | Session004 | User001 | User002 | User001 | User001, User002 | Viewpoint synchronization | ~ | ~ |
| Session012 | Session005 | User011 | User011, User012, User013, User014 | User011 | User011, User012, User013 | Viewpoint synchronization | Designation | User012 |
| Session013 | Session006 | User021 | User022, User023 | User021 | User022, User023 | Viewpoint synchronization | Automatic | User022 |

FIG. 26

Anchor information (At the time of starting of presentation)

| Anchor ID | Session ID | Virtual object data | Feature quantity | Virtual object position information | Sensor information | Owner | Operator | Viewpoint synchronization | Viewpoint position information | Copy source anchor | Copying virtual object position information |
|---|---|---|---|---|---|---|---|---|---|---|---|
| anchor001 | Session001 | object1.obj | feature1.dat | (1,23,31) | Beacon:123 | UserA | UserA | – | – | – | – |
| anchor002 | Session002 | object2.obj | feature2.dat | (1,3,22) | Wifi:345 | UserE | UserF | – | – | – | – |
| anchor003 | Session003 | object3.obj | feature3.dat | (25,3,41) | Beacon:123 | UserX | UserY | – | – | – | – |
| anchor004 | Session004 | object4.obj | feature4.dat | (22,12,21) | Beacon:123 | User001 | User001 | – | – | – | – |
| anchor005 | Session005 | object5.obj | feature5.dat | (80,9,20) | Wifi:345 | User011 | – | – | – | – | – |
| anchor006 | Session005 | object6.obj | feature6.dat | (13,8,26) | Wifi:345 | User011 | User001 | – | – | – | – |
| anchor007 | Session005 | object7.obj | feature7.dat | (16,10,19) | Wifi:345 | User011 | User012 | – | – | – | – |
| anchor008 | Session006 | object8.obj | feature8.dat | (81,12,16) | Beacon:123 | User021 | User022 | – | – | – | – |
| : | : | : | : | : | : | : | : | : | : | : | : |
| anchor011 | Session011 | object11.obj | feature4.dat | (22,12,21) | Beacon:123 | User001 | User001 | ○ | (−3,−9,−10) | anchor004 | (22,12,21) |
| anchor012 | Session012 | object12.obj | feature6.dat | (13,8,26) | Wifi:345 | User011 | User001 | ○ | (−10,−5,−50) | anchor006 | (13,8,26) |
| anchor013 | Session012 | object13.obj | feature7.dat | (16,10,19) | Wifi:345 | User011 | User012 | ○ | (−12,−5,−30) | anchor007 | (16,10,19) |
| anchor014 | Session013 | object14.obj | feature8.dat | (81,12,16) | Beacon:123 | User021 | User022 | ○ | (−5,−20,−15) | anchor008 | (81,12,16) |
| : | : | : | : | : | : | : | : | : | : | : | : |

FIG. 27

Anchor information (At the time of ending of presentation)

| Anchor ID | Session ID | Virtual object data | Feature quantity | Virtual object position information | Sensor information | Owner | Operator | Viewpoint synchronization | Viewpoint position information | Copy source anchor | Copying virtual object position information |
|---|---|---|---|---|---|---|---|---|---|---|---|
| anchor001 | Session001 | object1.obj | feature1.dat | (1,23,31) | Beacon:123 | UserA | UserA | – | – | – | – |
| anchor002 | Session002 | object2.obj | feature2.dat | (1,3,22) | Wifi:345 | UserE | UserF | – | – | – | – |
| anchor003 | Session003 | object3.obj | feature3.dat | (25,3,41) | Beacon:123 | UserX | UserY | – | – | – | – |
| anchor004 | Session004 | object4.obj | feature4.dat | (22,12,21) | Beacon:123 | User001 | User001 | – | – | – | – |
| anchor005 | Session005 | object5.obj | feature5.dat | (80,9,20) | Wifi:345 | User011 | – | – | – | – | – |
| anchor006 | Session005 | object6.obj | feature6.dat | (13,8,26) | Wifi:345 | User011 | User001 | – | – | – | – |
| anchor007 | Session005 | object7.obj | feature7.dat | (50,15,35) | Wifi:345 | User011 | User012 | – | – | – | – |
| anchor008 | Session006 | object8.obj | feature8.dat | (81,12,16) | Beacon:123 | User021 | User022 | – | – | – | – |
| : | : | : | : | : | : | : | : | : | : | : | : |
| anchor011 | Session011 | object11.obj | feature4.dat | (22,12,21) | Beacon:123 | User001 | User001 | ○ | (−3,−9,−10) | anchor004 | (22,12,21) |
| anchor012 | Session012 | object12.obj | feature6.dat | (22,3,14) | Wifi:345 | User011 | User001 | ○ | (−10,−5,−50) | anchor006 | (13,8,26) |
| anchor013 | Session012 | object13.obj | feature7.dat | (20,02,20) | Wifi:345 | User011 | User012 | ○ | (−12,−5,−30) | anchor007 | (16,10,19) |
| anchor014 | Session013 | object14.obj | feature8.dat | (81,12,16) | Beacon:123 | User021 | User022 | ○ | (−5,−20,−15) | anchor008 | (81,12,16) |
| : | : | : | : | : | : | : | : | : | : | : | : |

FIG. 31

Session information

| Session ID | Copy source sessio | Session issuer | Login user | Presenter | Attendant | Presentation method | Control transfer method | Controller |
|---|---|---|---|---|---|---|---|---|
| : | : | : | : | : | : | : | : | : |
| Session007 | – | User101 | User101, User102, User103, User111, User112, User113, User121, User122, User123 | User101 | User101, User102, User103, User111, User112, User113, User121, User122, User123 | – | – | – |
| : | : | : | : | : | : | : | : | : |
| Session80 | Session007 | User101 | Group001 | User101 | Group001 | Viewpoint synchronization | – | – |
| Session81 | Session007 | User101 | Group002 | User111 | Group002 | Viewpoint synchronization | Designation | User112 |
| Session82 | Session007 | User101 | Group003 | User121 | Group003 | Viewpoint synchronization | Automatic | User123 |
| : | : | : | : | : | : | : | : | : |

FIG. 32

Anchor information (At the time of starting of grouping)

| Anchor ID | Session ID | Virtual object data | Feature quantity | Virtual object position information | Sensor information | Owner | Operator | Viewpoint synchronization object | Viewpoint position information | Copy source anchor | Copying virtual object position information |
|---|---|---|---|---|---|---|---|---|---|---|---|
| : | : | : | : | : | : | : | : | : | : | : | : |
| anchor009 | Session007 | object9.obj | feature9.dat | (79,38,100) | Beacon123 | User101 | ~ | ~ | ~ | ~ | ~ |
| : | : | : | : | : | : | : | : | : | : | : | : |
| anchor101 | Session80 | object101.obj | feature9.dat | (79,38,100) | Beacon123 | User101 | User101 | ○ | (−10,−33,−15) | anchor009 | (79,38,100) |
| anchor102 | Session81 | object102.obj | feature9.dat | (79,38,100) | Beacon123 | User111 | User111 | ○ | (−25,−50,−15) | anchor009 | (79,38,100) |
| anchor103 | Session82 | object103.obj | feature9.dat | (79,38,100) | Beacon123 | User121 | User121 | ○ | (−30,−17,−20) | anchor009 | (79,38,100) |
| : | : | : | : | : | : | : | : | : | : | : | : |

FIG. 33

Anchor information (At the time of ending of grouping)

| Anchor ID | Session ID | Virtual object data | Feature quantity | Virtual object position information | Sensor information | Owner | Operator | Viewpoint synchronization object | Viewpoint position information | Copy source anchor | Copying virtual object position information |
|---|---|---|---|---|---|---|---|---|---|---|---|
| : | : | : | : | : | : | : | : | : | : | : | : |
| anchor009 | Session007 | object9.obj | feature9.dat | (79,38,100) | Beacon:123 | User101 | ~ | ~ | ~ | ~ | ~ |
| : | : | : | : | : | : | : | : | : | : | : | : |
| anchor101 | Session80 | object101.obj | feature9.dat | (79,38,100) | Beacon:123 | User101 | User101 | ○ | (−10,−33,−15) | anchor009 | (79,38,100) |
| anchor102 | Session81 | object102.obj | feature9.dat | (54,12,11) | Beacon:123 | User111 | User112 | ○ | (−25,−50,−15) | anchor009 | (79,38,100) |
| anchor103 | Session82 | object103.obj | feature9.dat | (52,11,28) | Beacon:123 | User121 | User123 | ○ | (−30,−17,−20) | anchor009 | (79,38,100) |
| : | : | : | : | : | : | : | : | : | : | : | : |

SYSTEM AND METHOD

BACKGROUND OF THE INVENTION

Field of the Invention

The present invention relates to a virtual object management system that allows a virtual object handled in augmented reality (AR) or virtual reality (VR) to be shared by a plurality of terminals.

Description of the Related Art

Similarly to VR or AR, XR has attracted attention as a generic term for techniques of generating a space for providing a simulated experience in which the real world and a virtual world are combined, and various standardizations have been tried therefor. Recently, structures for projecting and displaying one virtual object at the same position in the real world (a real space) using a plurality of terminals have been realized on platforms which are provided by various companies. For example, there is a cloud system that manages a virtual object which is disposed to overlap an image in the real world and which is projected onto the real world and feature quantities in the real world ascertained using a camera or the like in correlation. By ascertaining the real world matching the feature quantities managed by the system using a camera of an arbitrary terminal, the virtual object managed in correlation with the feature quantities can be viewed using the arbitrary terminal.

In the related art, an image referred to by a certain terminal can be shared as an image to be referred to by another terminal. For example, when an image in which a virtual object is projected onto the real world is referred to by a terminal of a certain operator, the image can be shared by a terminal of another operator.

In Japanese Patent No. 6244069, a virtual object can be displayed to overlap an image on a wearable terminal side by sharing the image captured by the wearable terminal with another remote terminal and inputting instruction information to a screen on the remote terminal side. In Japanese Patent No. 6244069, the disposed virtual object can be displayed to move by recognizing an image of movement of a finger of a user operating the remote terminal on the remote terminal side.

In Japanese Unexamined Patent Application Publication No. 2016-71900, when a virtual object disposed in a virtual space is shared by a plurality of users, a virtual object referred to by a certain user is presented in a direction in which another user views the virtual object.

When a virtual object projected onto an image in the real world is referred to by terminals, the terminals can operate the virtual object referred to from viewpoints thereof. On the other hand, when an "image including a virtual object" referred to by a certain terminal is shared by another terminal, a user of the other terminal has difficulty operating the virtual object in the image.

For example, in Japanese Patent No. 6244069, an operation of displaying and moving a virtual object is possible, but a background image on the wearable terminal side is included in the image shared by the remote terminal. Accordingly, in Japanese Patent No. 6244069, a user of the remote terminal feels discomfort when the user operates the virtual object using the remote terminal.

In Japanese Unexamined Patent Application Publication No. 2016-71900, a referenced method when users share a virtual object in a virtual space is described. However, in Japanese Unexamined Patent Application Publication No. 2016-71900, a reference method or a control method when a virtual object projected in correlation with feature quantities in the real world is shared by users is not considered.

SUMMARY OF THE INVENTION

According to an embodiment of the present invention, there is provided a system that manages a virtual object. The system includes: a management means configured to manage viewpoint information of a user of a first terminal for a virtual object which is provided using the first terminal and which is projected in the first terminal for the user of the first terminal; and a provision means configured to provide information of the virtual object to be projected in a second terminal in response to a feature quantity in the real world for displaying the virtual object in correlation with the real world which is detected by the second terminal. Control for switching between projection of the virtual object corresponding to a viewpoint of the user of the first terminal and projection of the virtual object corresponding to a viewpoint other than the viewpoint using the managed viewpoint information on the basis of an instruction for projection of the virtual object is performed in the second terminal.

Further features of the present invention will become apparent from the following description of exemplary embodiments with reference to the attached drawings.

BRIEF DESCRIPTION OF THE DRAWINGS

FIG. 3 is a diagram illustrating an example of a software configuration of the virtual object management system or the like.

FIG. 4 is a diagram illustrating a data example of anchor information.

FIG. 5 is a diagram illustrating a data example of section information.

FIG. 25 is a diagram illustrating session information at the time of starting of a presentation according to a second embodiment.

FIG. 26 is a diagram illustrating anchor information at the time of starting of a presentation according to the second embodiment.

FIG. 27 is a diagram illustrating anchor information at the time of ending of a presentation according to the second embodiment.

FIG. 31 is a diagram illustrating session information at the time of starting of grouping.

FIG. 32 is a diagram illustrating anchor information at the time of starting of grouping.

FIG. 33 is a diagram illustrating anchor information at the time of ending of grouping.

DESCRIPTION OF THE EMBODIMENTS

Hereinafter, embodiments of the present invention will be described with reference to the accompanying drawings or the like. The following embodiments are not for limiting the inventions described in the appended claims, and all features described in the following embodiments cannot be said to be essential to the present invention.

First Embodiment

Figure 1:
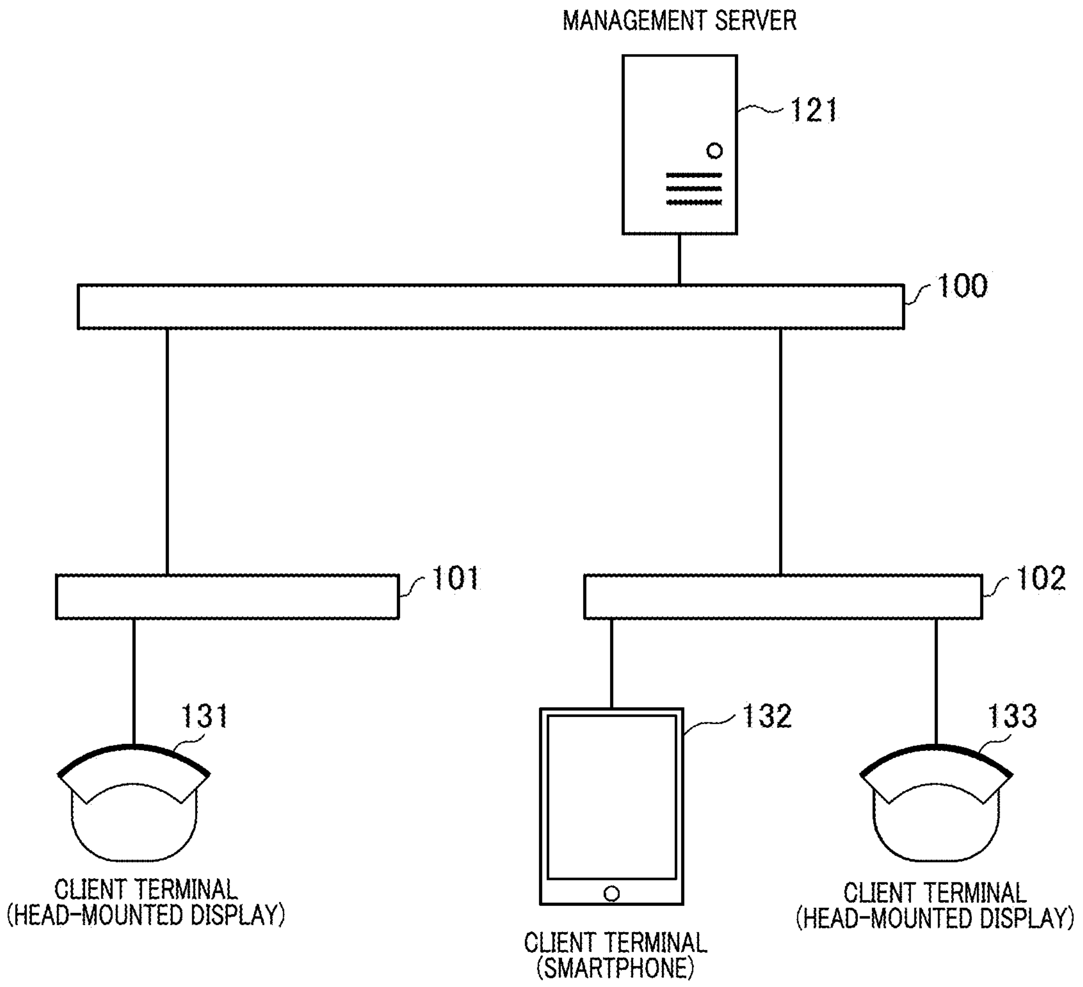
FIG. 1 is a diagram illustrating an entire configuration of a virtual object management system according to a first embodiment.

FIG. 1 is a diagram illustrating an entire configuration of a virtual object management system according to a first embodiment.

A management server 121 is connected to client terminals 131 to 133 via networks 100 to 102. In the example illustrated in FIG. 1, the management server 121 is connected to networks 101 and 102 via a network 100. The client terminal 131 is connected to the network 101. The client terminals 132 and 133 are connected to the network 102.

The networks 100 to 102 are communication networks that can transmit and receive data. The networks 100 to 102 are realized by a LAN such as the Internet, a WAN, a telephone line, a dedicated digital line, or the like. The networks 100 to 102 may be an asynchronous transfer mode (ATM) or a frame relay line, a cable television line, a data broadcast wireless line, or the like. For example, the network 100 illustrated in FIG. 1 is the Internet. The networks 101 and 102 are the Internet, a network in an ordinary home or a company, a wireless LAN set on streets, or the like.

The client terminals 131 to 133 are network devices to which a service is provided by the management server 121. Each client terminal may be dedicated hardware corresponding to drawing of a virtual object which is handled in XR, an information processing device including an execution environment of drawing graphic software of a virtual object, or the like. Examples of the client terminals include a head-mounted display (HMD), smart glasses, a smartphone, a table terminal, and a personal computer.

Each of the client terminals 131 to 133 includes a camera that images the surroundings and a display that displays a virtual object. The client terminals 131 to 133 image the surroundings using the camera or the like and can project and display a virtual object on an image of the real world which is displayed on the display in an overlapping manner. Accordingly, the client terminals 131 to 133 can provide a simulated experience in which the real world and a virtual world are combined to users. When the client terminals 131 to 133 are not dedicated hardware, a virtual object may be drawn in the client terminals 131 to 133 using a web browser or an API which is provided by an OS.

The management server 121 is a system that provides a service using a virtual object. The management server 121 may be constructed, for example, by an information processing device such as a server computer or may be constructed by a plurality of information processing devices distributed and arranged using cloud computing technology or the like. The functions of the server which will be describe later may be realized by a single server or a signal virtual server, or may be realized by a plurality of servers or a plurality of virtual servers. Alternatively, a plurality of virtual servers may be executed in a signal server.

The service provided by the management server 121 includes a service of managing a virtual object which is disposed to overlap an image in the real world and which is disposed in a virtual space projected to the real world and a feature quantity in the real world ascertained using a camera or the like in correlation. In this service, the management server 121 manages correlation information for correlating a virtual object with a feature quantity in the real world ascertained using the camera or the like. In the following description, the correlation information is also referred to as an anchor. The correlation information may include property information including an identifier for identifying an anchor, a session ID, or various parameters as will be described later in addition to the anchor.

The management server 121 receives an anchor registration request from the client terminals 131 to 133 and manages registered anchors. The management server 121 receives an anchor acquisition request from the client terminals 131 to 133 and returns an anchor satisfying conditions out of the managed anchors to a device which is a request source.

The service provided by the management server 121 includes a service of providing a virtual object to an external terminal. Accordingly, the management server 121 also manages users who use the client terminals 131 to 133. For example, the management server 121 receives a login request or a logout request from the client terminals 131 to 133 and performs a login process or a logout process for the service.

Figure 2:
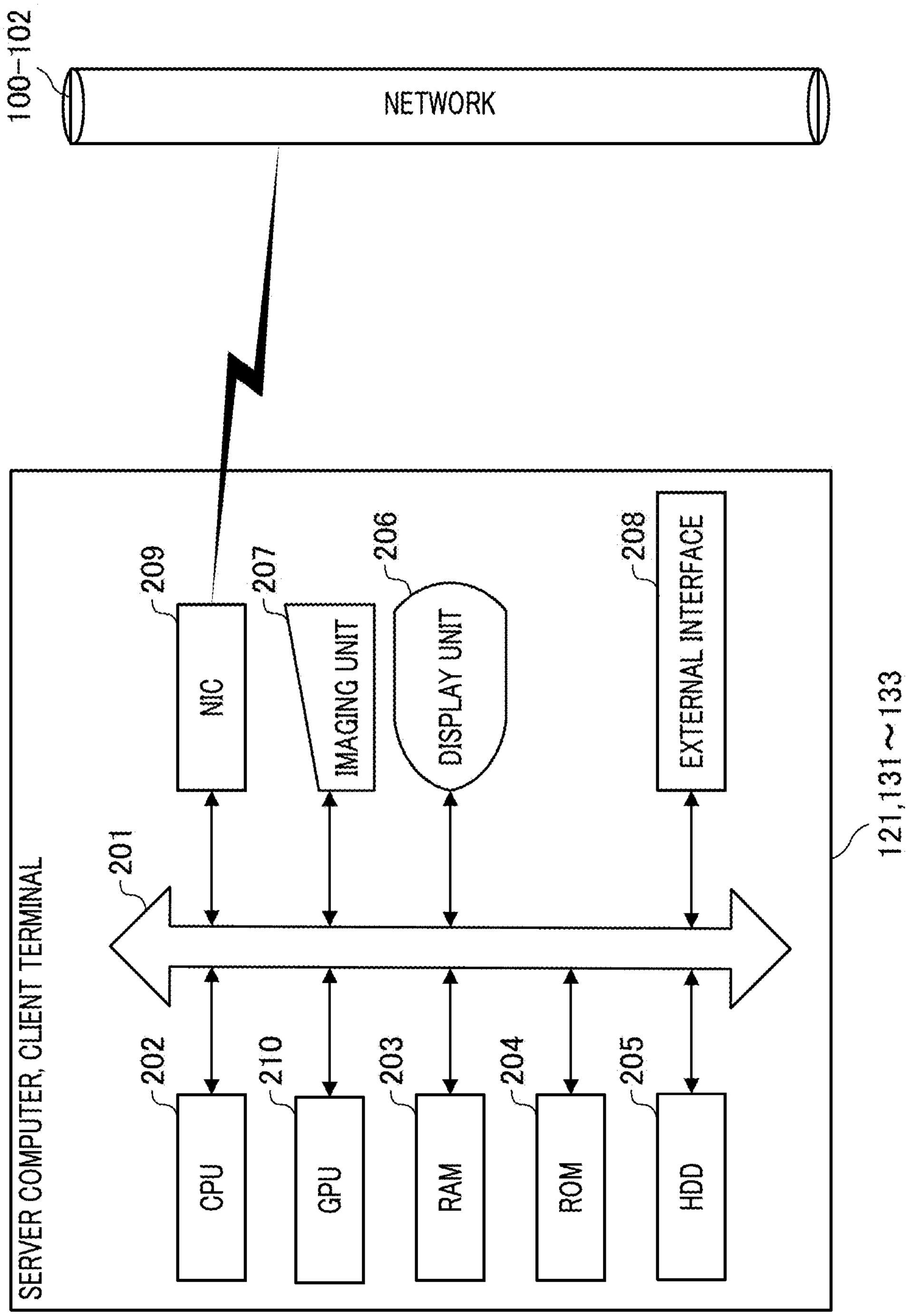
FIG. 2 is a diagram illustrating an example of a hardware configuration of the virtual object management system.

FIG. 2 is a diagram illustrating an example of a hardware configuration of the management server 121 or the like according to the first embodiment. In FIG. 2, the management server 121 is realized as an information processing device such as a general server computer. The basic hardware configuration of the client terminals 131 to 133 is the same as that of the management server 121, and thus description thereof will not be repeated.

Devices of the management server 121 include a system bus 201, a CPU 202, a RAM 203, a ROM 204, an HDD 205, a display unit 206, an imaging unit 207, an external interface 208, an NIC 209, and a GPU 210. CPU is an abbreviation of Central Processing unit, and RAM is an abbreviation of Random Access Memory. ROM is an abbreviation of Read Only Memory, and HDD is an abbreviation of Hard Disc Drive. GPU is an abbreviation of Graphics Processing Unit.

A system bus 201 is a bus taking charge of a flow of data in the device. Elements of the devices are connected to each other via the system bus 201.

The CPU 202 executes software such as an application program or an operating system (OS) stored in the HDD 205 and comprehensively controls hardware units connected to the system bus 201. The RAM 203 serves as a main memory, a work area, and the like of the CPU 202. The ROM 204 stores various types of data such as a basic I/O program.

The HDD 205 serves as a large-capacity memory and stores application programs of a web browser, programs of a service server group, an OS, relevant programs, and the like. A solid state drive (SSD) or the like may be used instead of the HDD 205.

The display unit 206 is constituted, for example, by a liquid crystal display and displays a virtual object or information required for operation. The display unit 206 may be externally attached according to a mode of the device.

The imaging unit 207 is provided in the client terminals 131 to 133. The imaging unit 207 need not be necessarily provided in the management server 121.

The imaging unit 207 includes, for example, an out-camera that captures an image of the surroundings of each of the client terminals 131 to 133 and an in-camera that captures an image of users thereof. By analyzing an image captured by the out-camera using an application program stored in the HDD 205, it is possible to enable display of arranging a virtual object to overlap an image of the real world and calculation of a feature quantity of the real world.

When the client terminals 131 to 133 are XR-dedicated terminals such as an HMD, a process of operating a virtual object displayed on the display unit 206 can be performed using a user finger imaged by the imaging unit 207. When the client terminals 131 to 133 are not XR-dedicated terminals such as smartphones, a process of operating a virtual object displayed on the display unit 206 can be performed by operating a touch panel disposed to overlap the display unit 206.

The external interface 208 is an interface for connecting an external device to the device and is used, for example, for connection of peripherals such as various externally attached sensors.

The NIC 209 is a network interface card for transmitting and receiving data to and from another node via the networks 100 to 102.

The GPU 210 is a processor that performs an arithmetic operation process required for drawing a virtual object in real time.

The device configuration illustrated in FIG. 2 is only an example, and the devices are not limited to the configuration. For example, a storage destination of data or programs may be changed to the ROM 204, the RAM 203, the HDD 205, and the like. Processes of software modules illustrated in FIG. 3 are realized by performing arithmetic operations of programs stored in the HDD 205 or the like through processing of one of the CPU 202 and the GPU 210 or cooperative processing of the CPU 202 and the GPU 210.

Figure 3:
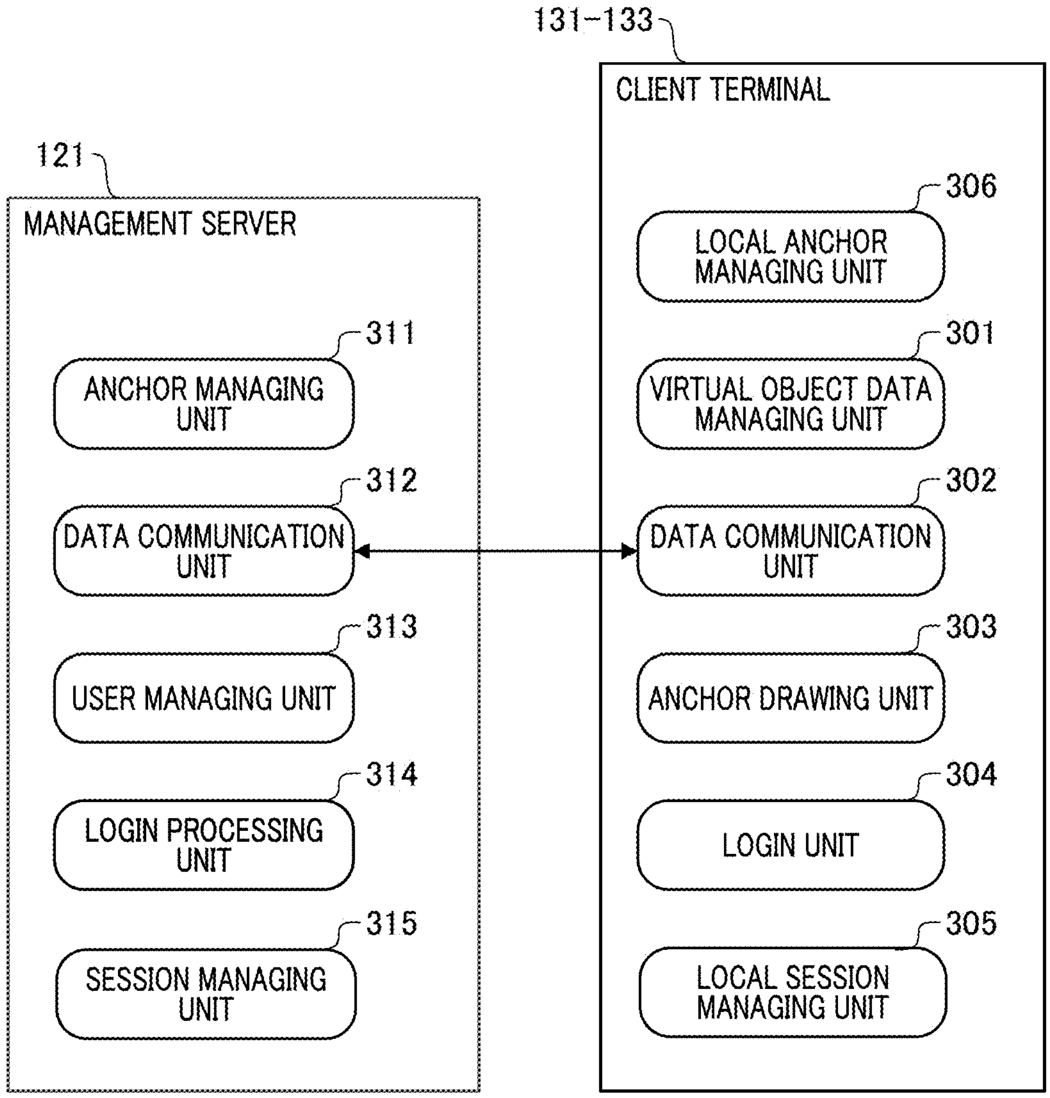

FIG. 3 is a diagram illustrating an example of a software configuration of the management server 121 and the client terminal 131 according to the first embodiment.

The management server 121 includes an anchor managing unit 311, a data communication unit 312, a user managing unit 313, a login processing unit 314, and a session managing unit 315 as software modules. The user managing unit 313 is an example of a management means, and the anchor managing unit 311 is an example of a provision means.

The login processing unit 314 receives a login request from the client terminals 131 to 133 via the data communication unit 312. The login processing unit 314 compares the received login request with information in the user managing unit 313. Then, the login processing unit 314 returns a login processing result of comparison to the client terminals 131 to 133.

When the login request includes a session ID, the login processing unit 314 performs a process of logging in with the session ID. When the login request does not include a session ID, the management server 121 generates a new session ID and performs the login process. The new session ID is generated by the session managing unit 315. An example of data of user information which is managed by the user managing unit 313 is described in Table 1.

TABLE 1

| User information | | |
|---|---|---|
| User ID | User name | Password |
| userA | Saburo | ********** |
| userB | Hanako | ********** |
| . | . | . |
| . | . | . |
| . | . | . |
| User011 | Taro | ********** |
| User012 | Jiro | ********** |
| . | . | . |
| . | . | . |
| . | . | . |

In the user information shown in Table 1, information such as user ID, user name, and password is managed in correlation. The user ID is an ID for uniquely identifying a user. The user name is a name of a user, and a nickname or the like may be freely set. The password is a password for basic authentication which is used for login with the user ID. In the user information shown in Table 1, user ID, user name, and password are correlated for each row.

The login processing unit 314 compares a combination of user ID and password included in the login request from the client terminals 131 to 133 with the user information in Table 1. Then, when information included in the login request matches Table 1, the login processing unit 314 determines that the login has succeeded and returns the login processing request to the client terminals 131 to 133.

The data communication unit 312 performs a process associated with an anchor registration request or an anchor acquisition request from the client terminals 131 to 133.

When an anchor registration request is received from the client terminals 131 to 133, the data communication unit 312 stores the received anchor information in the anchor managing unit 311. When an anchor acquisition request is received from the client terminals 131 to 133, the data communication unit 312 instructs the anchor managing unit 311 to retrieve an anchor satisfying conditions. The data communication unit 312 returns an anchor retrieval result from the anchor managing unit 311 to the client terminals 131 to 133.

FIG. 4 is a diagram illustrating a data example of anchor information managed by the user managing unit 313. In the anchor information illustrated in FIG. 4, information such as anchor ID, session ID, virtual object data, feature quantity, virtual object position information, sensor information, owner, operator, viewpoint synchronization object, viewpoint position information is managed in correlation.

When the data communication unit 312 receives an anchor registration request from the client terminals 131 to 133, the anchor managing unit 311 stores a record of the received anchor as anchor information.

The anchor ID is an ID for uniquely identifying an anchor and is assigned when the anchor managing unit 311 stores a record in the anchor information (FIG. 4). Regarding the session ID, the same ID is assigned to the same session by the anchor managing unit 311. By correlating a plurality of anchors with one session ID, it is possible to simultaneously present a plurality of anchors with the same session ID to a user.

The virtual object data is data of a 3D model in an arbitrary format. The feature quantities are three-dimensional feature quantities in the real world which is acquired by analyzing data obtained by causing the imaging unit 207 to image the surroundings of the anchor. The feature quantities include reference point information serving as a reference point for anchor arrangement. For example, a reference point may be a three-dimensional average position of all feature points included in the feature quantities of an anchor (a central position or a gravitational center position of the feature points).

The virtual object position information is a three-dimensional position of a virtual object in the real world. The virtual object position information indicates, for example, coordinates relative to the reference point. The sensor information is information of a position at which an anchor is disposed (coordinates of a GPS), a beacon or a WiFi ID correlated with the anchor, or the like. The data communication unit 312 can return one anchor correlated with a specific anchor ID in response to the anchor acquisition request from the client terminals 131 to 133. The data communication unit 312 may return a plurality of anchors correlated with the same session ID or the same sensor ID in response to an anchor acquisition request from the client terminals 131 to 133.

The owner indicates a user ID of a user who has prepared the anchor. One of values of the user IDs in Table 1 is stored in the item of owner in the anchor information illustrated in FIG. 4. The operator is information for identifying a user who is operating the virtual object. In the operator in the anchor information in FIG. 4, a user ID of a terminal which is operating the virtual object out of the client terminals 131 to 133 is stored.

The management server 121 can provide functions of "image sharing" and "viewpoint synchronization" to a plurality of terminals participating in the same session. The functions are functions of sharing an image or a viewpoint which is viewed with an arbitrary terminal with another terminal in real time while a plurality of client terminals 131 to 133 are participating in the same session and sharing a virtual object.

The "image sharing" is equivalent to a presentation function in a web conference system according to the related art. In the web conference system according to the related art, a PC image of a presenter is shared in real time on a PC screen of another attendant. In the image sharing according to this embodiment, an image in which a virtual object is drawn on an "image in the real world" captured using the imaging unit 207 by an anchor drawing unit 303 which will be described later is shared.

On the other hand, in the "viewpoint synchronization," a viewpoint of an arbitrary terminal of the client terminals 131 to 133 referring to a virtual object is synchronized with a viewpoint of another terminal. Accordingly, the other terminal can refer to the virtual object from the same viewpoint as the arbitrary terminal.

In the following description, sharing a virtual object using the function of image sharing or viewpoint synchronization while the virtual object in the same session is being shared by a plurality of terminals is referred to as a "presentation."

In the anchor information illustrated in FIG. 4, the viewpoint synchronization object represents information indicating whether the corresponding anchor is an anchor in viewpoint synchronization. A circular mark in FIG. 4 indicates viewpoint synchronization. In the example illustrated in FIG. 4, anchor IDs "anchor005," "anchor006," and "anchor007" are correlated with a session ID "Session005." In the session ID "Session005," two anchor IDs "anchor006" and "anchor007" are in viewpoint synchronization. In the session ID "Session005," the anchor ID "anchor005" is not in viewpoint synchronization.

In a presentation using viewpoint synchronization, a user may be able to select which anchor in the same session is to be synchronized through a selection screen (not illustrated) displayed on the corresponding terminal.

In the anchor information illustrated in FIG. 4, the viewpoint position information is an example of viewpoint information and includes position information of a viewpoint of a presenter (a presentation starting user) in the anchor in viewpoint synchronization. The viewpoint position information of a presenter indicates a three-dimensional position in the real world of the imaging unit 207 in a terminal of the presenter and is expressed as coordinates relative to the reference point.

Here, the viewpoint synchronization object and the viewpoint position information are registered in the anchor information by the anchor managing unit 311 when the data communication unit 312 receives a viewpoint-synchronization presentation start request from the client terminals 131 to 133.

FIG. 5 is a diagram illustrating a data example of session information which is managed by the session managing unit 315. In the session information illustrated in FIG. 5, information such as session ID, session issuer, login user, presenter, attendant, presentation method, control transfer method, and controller is managed in correlation.

The session ID is an ID for uniquely identifying a session. The session issuer is a user ID of a user who has prepared the session. The login user is a user ID of a user who logs in to the session.

When a session ID is not included in a login request as described above, a new session ID is generated by the session managing unit 315, and the generated session ID is registered in the session information. Then, the session managing unit 315 registers a user ID of a user who has transmitted the login request in the session issuer of the corresponding session ID in the session information.

On the other hand, when a session ID is included in the login request, the session managing unit 315 registers a user ID of a user who has transmitted the login request in the login user of the corresponding session ID in the session information.

The presenter is a user ID of a user who starts a presentation using the function of image sharing or viewpoint synchronization. The attendant is a user ID of a user who attends the presentation.

For example, when the session ID is "Session002" and "Session005," the user IDs "UserH" and "User014" are present in the login user but are not present in the attendant. In this case, these users are not in image sharing or viewpoint synchronization. These users refer to an anchor correlated with the session ID from viewpoints thereof based on the anchor information (FIG. 4).

When the data communication unit 312 receives a presentation start request from the client terminals 131 to 133, the session managing unit 315 registers a user ID who has transmitted the presentation start request in the presenter and the attendant in the session information (FIG. 5). User IDs of a plurality of users who attend the presentation are registered in the attendant.

A user who is an attendant transmits a presentation attendance request from the client terminals 131 to 133 to the management server 121 after the presentation has been started. Accordingly, the session managing unit 315 registers user IDs of attendants in response to the request in the session information (FIG. 5). When a presentation withdrawal request is transmitted from the client terminals 131 to 133 of the users attending the presentation to the management server 121, the session managing unit 315 deletes the user ID of the user who has requested withdrawal in response to the request from the attendant.

The presentation method is registered by the session managing unit 315 based on a presentation method included in a presentation start request when the request is received by the data communication unit 312. The presentation method includes one of image sharing and viewpoint synchronization. The presentation method included in the presentation start request is set by selection by the users using the client terminals 131 to 133 at the time of starting of the presentation.

The control transfer method is a method of transferring control authority to perform an "operation on a virtual object in an image by a presenter in image sharing" or an "operation on a virtual object by a presenter from a presenter viewpoint in viewpoint synchronization" from the presenter to another attendant. The controller is a user ID of a user to whom the control authority has been transferred or who has the control authority.

The control transfer method includes "designation" and "automatic" and one method thereof is selected when control transfer from a presenter is requested after a presentation has been started. In "designation," a presenter designates one of the attendants, and the control authority is transferred to the designated attendant. In "automatic," the control transfer is automatically transferred to the attendants.

An example of the control transfer method when the control transfer method is "automatic" will be described below.

As an example in which the presentation method is image sharing, it is assumed that, when a user touches a virtual object in a shared image with a finger and moves the finger to right or left, operation control for allowing the virtual object in the image to move to right or left along with the finger's movement is possible. When "automatic" is selected as the control transfer method in the example, the control authority is transferred to a user at a timing at which the user touches the virtual object in the image with a finger, and the controller is updated. At this time, when another user is touching the virtual object, the control authority is not transferred even if any user touches the virtual object in the image in the meantime. When the user touching the virtual object with a finger stops the touch, the control authority is returned from the user at that timing, and the user is deleted from the controller.

As an example in which the presentation method is viewpoint synchronization, it is assumed that a virtual object which is a viewpoint synchronization object can move like an object in the real world by performing a motion of touching the virtual object with a finger or a hand. When "automatic" is selected as the control transfer method in the example, the control authority is transferred to a user at a timing at which the user touches the virtual object, and the controller is updated. At this time, when another user is touching the virtual object in advance, the control authority is not transferred even if any user touches the virtual object in the meantime. When the user detaches the finger or the hand from the virtual object, the control authority is returned from the user at that timing, and the user is deleted from the controller.

The software configuration of the client terminals 131 to 133 will be described below with reference back to FIG. 3. Each of the client terminals 131 to 133 includes a virtual object data managing unit 301, a data communication unit 302, an anchor drawing unit 303, a login unit 304, a local session managing unit 305, and a local anchor managing unit 306 as software modules.

The login unit 304 transmits a login request to the management server 121 via the data communication unit 302 when a user requests log-in by inputting a user name and a password. At this time, the user name and the password are input, for example, using a "finger imaged by the imaging unit 207," an "operation of a touch panel provided in the display unit 206," an "input device connected to the external interface 208."

The login unit 304 presents an existing session ID list stored in the local session managing unit 305 to a user through a user login screen (not illustrated). When the user selects a session ID, a login request is transmitted to the management server 121, and the login succeeds, the terminal can participate in a session with the corresponding session ID. When the login request is transmitted to the management server 121 in a state in which the user does not select the session ID and the login succeeds, the terminal starts a session with a new session ID.

As an authentication method in the management server 121 at the time of login, face authentication using a face image captured by the imaging unit 207, iris authentication using an iris, fingerprint authentication using a fingerprint sensor connected to the external interface 208, or the like may be used.

When the login unit 304 receives designation of a session ID stored in the local session managing unit 305 from a user, the virtual object data managing unit 301 stores data of 3D models in various formats. The data of 3D models stored in the virtual object data managing unit 301 are virtual objects which can be freely disposed to overlap an image in the real world by a user.

The local anchor managing unit 306 takes charge of a process of preparing an anchor in response to a user's operation. The user selects a 3D model (a virtual object) stored in the virtual object data managing unit 301 via the local anchor managing unit 306. A virtual object to be projected can be disposed based on a finger imaged by the imaging unit 207 or an operation of a touch panel provided in the display unit 206. At the time of preparation of an anchor, the local anchor managing unit 306 correlates a session ID of a session to which the user currently logs in with the anchor. When the anchor is prepared, the local anchor managing unit 306 transmits an anchor registration request to the management server 121 via the data communication unit 302.

Figure 6A:
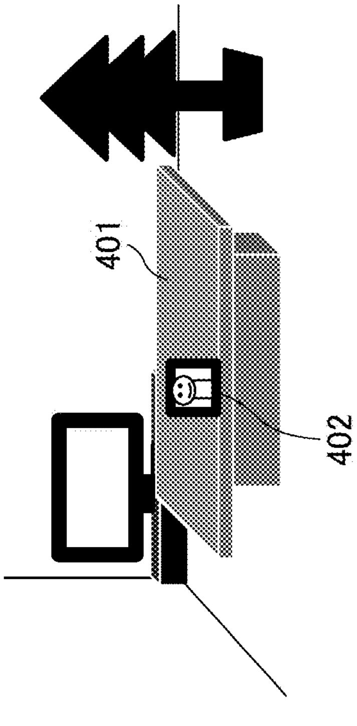
FIGS. 6A and 6B are diagrams illustrating an example of a user environment in the real world corresponding to a client terminal.
Figure 6B:
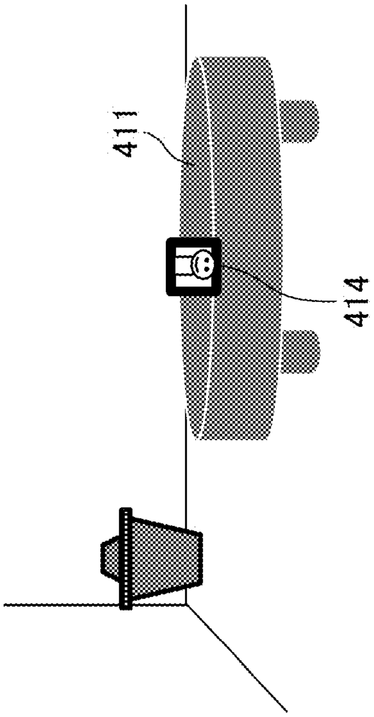

FIGS. 6A and 6B are diagrams illustrating user environments in the real world from viewpoints of users of the client terminals 131 and 133. In this case, it is assumed that the client terminals 131 and 133 are of an HMD type. In FIG. 6A, an AR marker 402 which is printed on paper such that it can be set as a feature quantity of an anchor is disposed on a table 401. In FIG. 6B, an AR marker 414 which is printed on paper and which is the same as in FIG. 6A is disposed on a table 411. The AR marker 402 of FIG. 6A and the AR marker 414 of FIG. 6B are placed such that directions of the AR markers are opposite to each other when viewed from the user. By acquiring anchors correlated with the AR markers 402 and 414 which are feature quantities, users located in distant places can share the same virtual object in the same session.

Figure 7B:
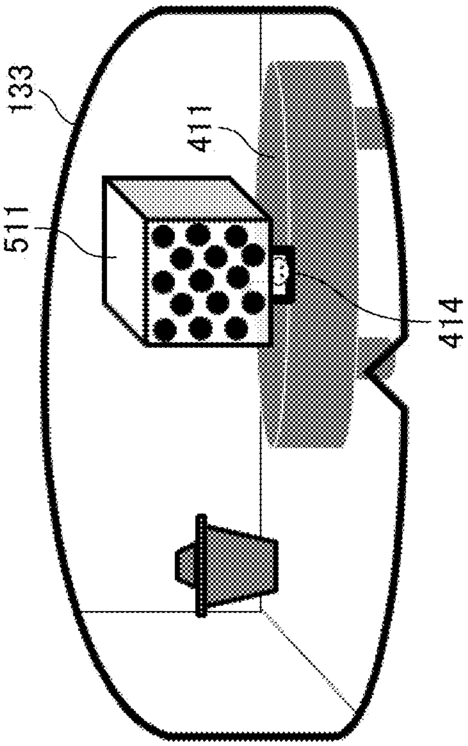
FIGS. 7A and 7B are diagrams illustrating an example of a display image in a client terminal.
Figure 7A:
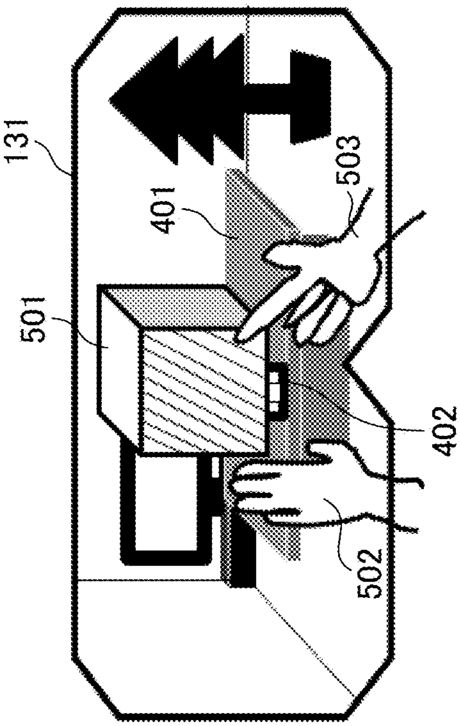

FIG. 7A illustrates an image which a user views via the display unit 206 of the client terminal 131 in the user environment illustrated in FIG. 6A. Similarly, FIG. 7B illustrates an image which a user views via the display unit 206 of the client terminal 133 in the user environment illustrated in FIG. 6B.

The user can operate a virtual object 501 stored in the virtual object data managing unit 301 of the client terminal 131 using the method and dispose the virtual object 501 such that the virtual object is projected onto the table 401 in the real world as illustrated in FIG. 7A. Subsequently, the local anchor managing unit 306 extracts a feature quantity of an image of the surroundings in which the virtual object is disposed by analyzing the image captured by the imaging unit 207 and stores the feature quantity in correlation with the virtual object as an anchor. Then, the local anchor managing unit 306 transmits a registration request of the stored anchor to the management server 121.

In this embodiment, the feature quantity extracted from the image of the surroundings is assumed to be the feature quantity of the AR marker 402. As the method of extracting a feature quantity, the AR marker 402 may be detected from the image of the surroundings in accordance with an instruction from the user and then the feature quantity of the AR marker 402 may be extracted. As another method, the feature quantity of the AR marker 402 may be extracted in advance by an information processing terminal (not illustrated) having generated the AR marker 402. In this case, the client terminal 131 can acquire the feature quantity of the AR marker by communicating with the information processing terminal having generated the AR marker 402 and store the acquired feature quantity in correlation with the virtual object.

In order to dispose the virtual object 501 to be projected as illustrated in FIG. 7A, the projected virtual object 501 can move in the image in accordance with an operation with hands (502 and 503) of the users in the real world as if it were an object in the real world.

The case of the other user corresponding to FIG. 7B will be described below.

In the example illustrated in FIG. 7B, the local anchor managing unit 306 of the client terminal 133 extracts a feature quantity of the surroundings image by analyzing the image of the surroundings captured by the imaging unit 207. In this embodiment, the feature quantity extracted from the surroundings image is the feature quantity of the AR marker 414.

Subsequently, the local anchor managing unit 306 requests the virtual object data managing unit 301 to acquire an anchor based on the feature quantity and acquires the anchor. Then, the local anchor managing unit 306 draws the virtual object 511 based on the anchor via the anchor drawing unit 303.

In this embodiment, the virtual object 511 illustrated in FIG. 7B is the same virtual object as the virtual object 501 which is disposed by the client terminal 131 in FIG. 7A. Since the directions of the AR markers 402 and 414 are opposite to each other as described above, the virtual object 511 in FIG. 7B is drawn at a viewpoint at which the virtual object 501 in FIG. 7A is viewed oppositely. The arrangement of the virtual objects 501 and 511 are determined based on the three-dimensional coordinates in the real world relative to the reference point included in the feature quantity of the anchor. In this embodiment, since the AR markers 402 and 414 are used as the feature quantity of the anchor, for example, the center positions of the AR markers 402 and 414 serves as the reference point.

As illustrated in FIGS. 7A and 7B, the users can share and refer to the same virtual object and operate the virtual object. When the user of the client terminal 131 moves the virtual object 501 by moving the user's hands 502 and 503, the virtual object 511 in the client terminal 133 moves together therewith. At that time, since the client terminals 131 and 133 view the AR markers 402 and 414 from the opposite viewpoints, the viewpoints of the terminals for the virtual object are different and moving directions of the virtual object are opposite to each other.

Figure 8A:
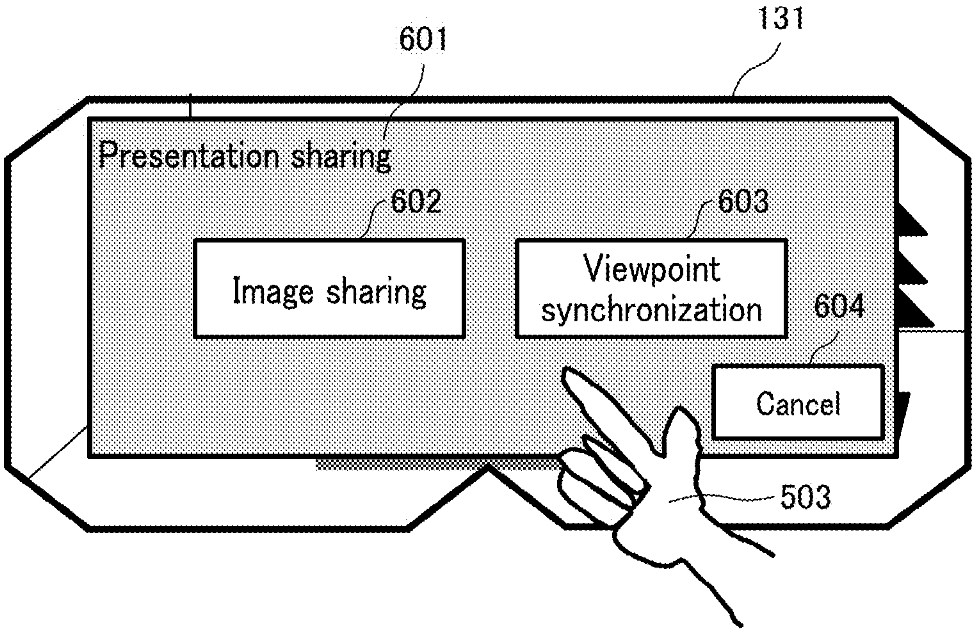
FIGS. 8A to 8C are diagrams illustrating a display example in image sharing of the same virtual object.
Figure 8B:
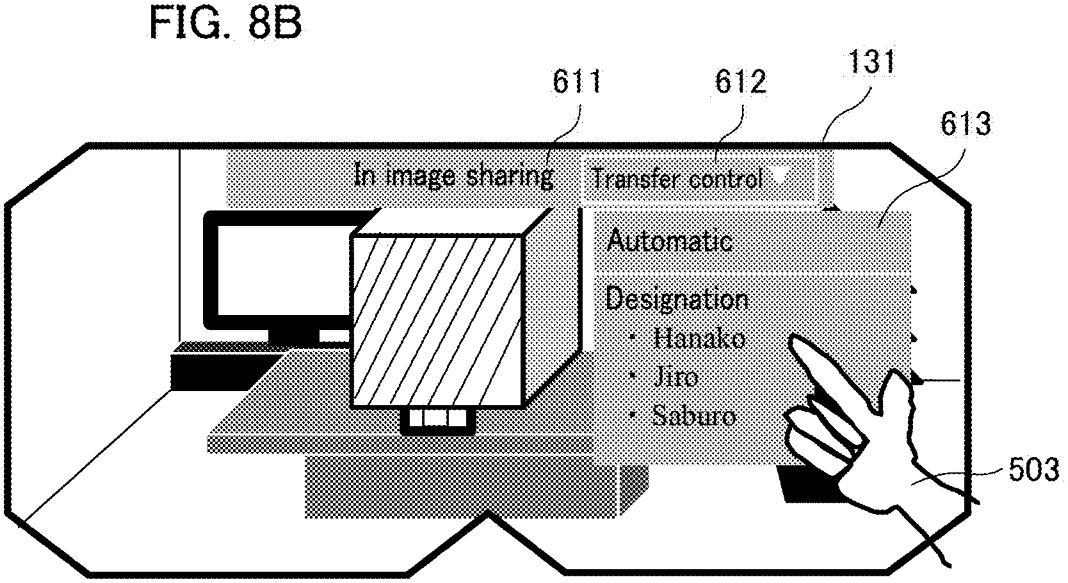
Figure 8C:
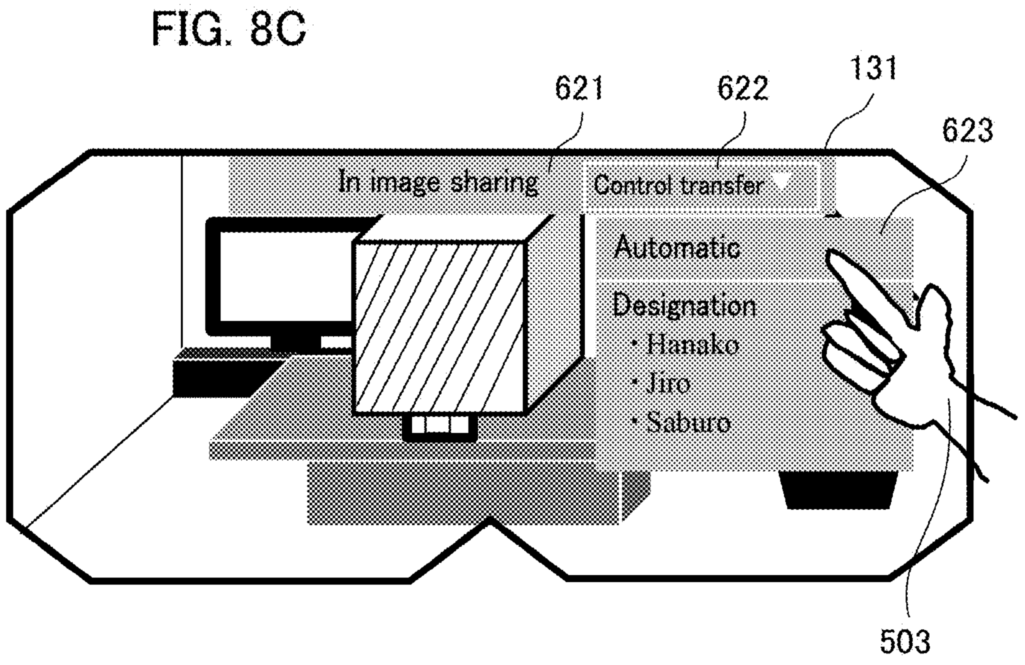

FIGS. 8A to 8C illustrate a display example when the same virtual object as in FIGS. 7A and 7B is shared using image sharing. In the example illustrated in FIGS. 8A to 8C, the "user of the client terminal 131" selects a presentation method, starts a presentation, and transfers the control authority of the presentation to the "user of the client terminal 133."

FIG. 8A illustrates a presentation method selection screen 601 which is displayed on the client terminal 131. The presentation method selection screen 601 is displayed when the local session managing unit 305 of the client terminal 131 receives a presentation start instruction from the user. The anchor drawing unit 303 displays the presentation method selection screen 601 on the display unit 206 in accordance with an instruction from the local session managing unit 305. The presentation start instruction from the user is transmitted using a "finger imaged by the imaging unit 207," an "operation of a touch panel provided in the display unit 206," or the like.

When an operation of pressing an image sharing button 602 is performed while the presentation method selection screen 601 is being displayed, the presentation is started in the image sharing mode and the screen transitions to the state illustrated in FIG. 8B. On the other hand, when an operation of pressing a viewpoint synchronization button 603 is performed while the presentation method selection screen 601 is being displayed, the presentation in the viewpoint synchronization mode is started and the screen transitions to the state illustrated in FIG. 8C. When an operation of pressing a cancellation button 604 is performed while the presentation method selection screen 601 is being displayed, the presentation is not started and the presentation method selection screen 601 is closed.

FIG. 8B is a diagram illustrating a display example of the display unit 206 of the client terminal 131 in image sharing. On the screen illustrated in FIG. 8B, a message 611 indicating that its image is shared by another user is displayed. On the screen illustrated in FIG. 8B, a control transfer button 612 for enabling the other user to operate the virtual object is displayed. When an operation of pressing the control transfer button 612 and opening a pulldown 613 is performed while the screen of FIG. 8B is being displayed, "automatic" or "designation" can be selected as the method of transferring control authority. In the case of "designation," a name list of presentation attendants which are candidates to be additionally designated is displayed, and the user of the client terminal 131 can designate one from the user list and transfer the control authority thereto.

FIG. 8C is a diagram illustrating a display example of the display unit 206 of the client terminal 131 in viewpoint synchronization. On the screen illustrated in FIG. 8C, a message 621 indicating that its own viewpoint is shared by another user using viewpoint synchronization is displayed. On the screen illustrated in FIG. 8C, a control transfer button 622 for enabling another user to operate the virtual object is displayed. When the control transfer button 622 is pressed to perform an operation of opening a pulldown 623 while the screen of FIG. 8C is being displayed, modes of "automatic" and "designation" can be selected as the method of transferring the control authority similarly to the pulldown 613.

In the example illustrated in FIGS. 8A to 8C, the operation of pressing a button on the screen and the selection operation from a list displayed in a pulldown manner are performed using a finger 503 imaged by the imaging unit 207 of the client terminal 131, but another method may be used.

Figure 9A:
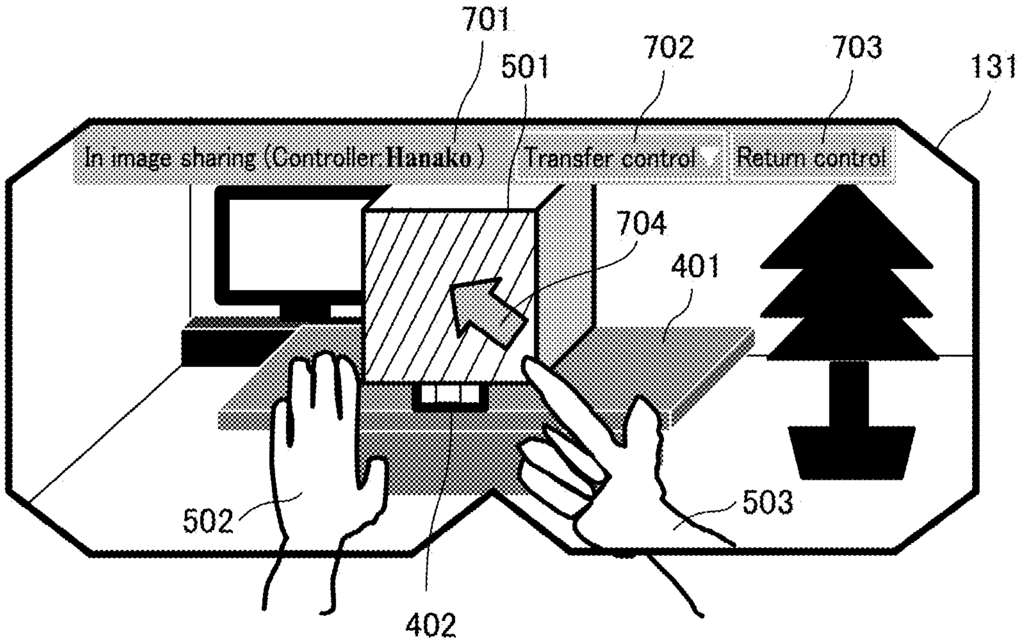
FIGS. 9A to 9C are diagrams illustrating a display example in image sharing of the same virtual object.
Figure 9B:
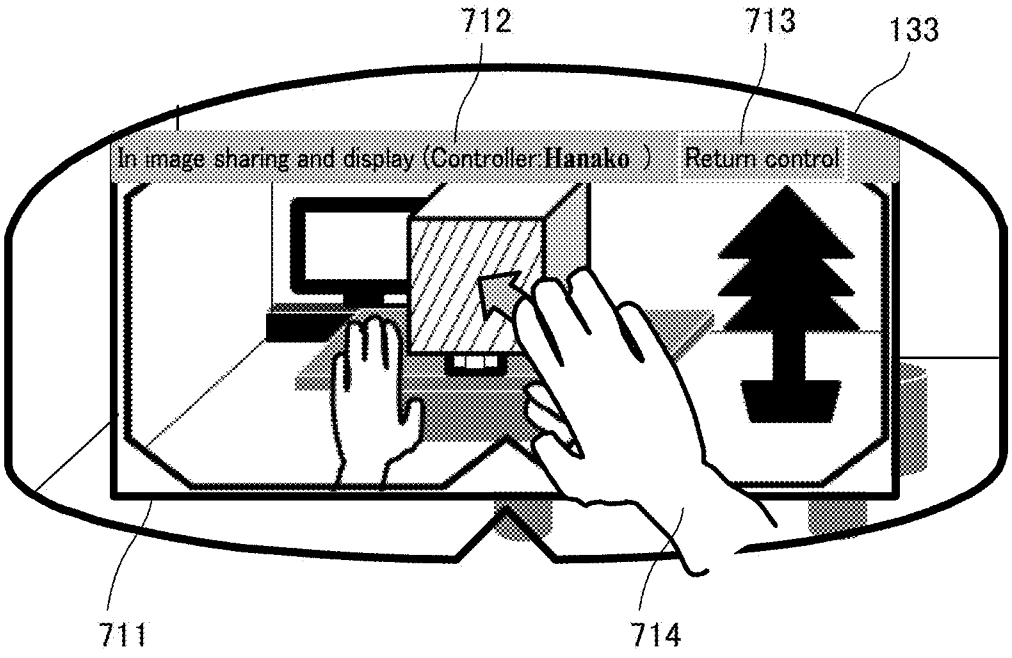
Figure 9C:
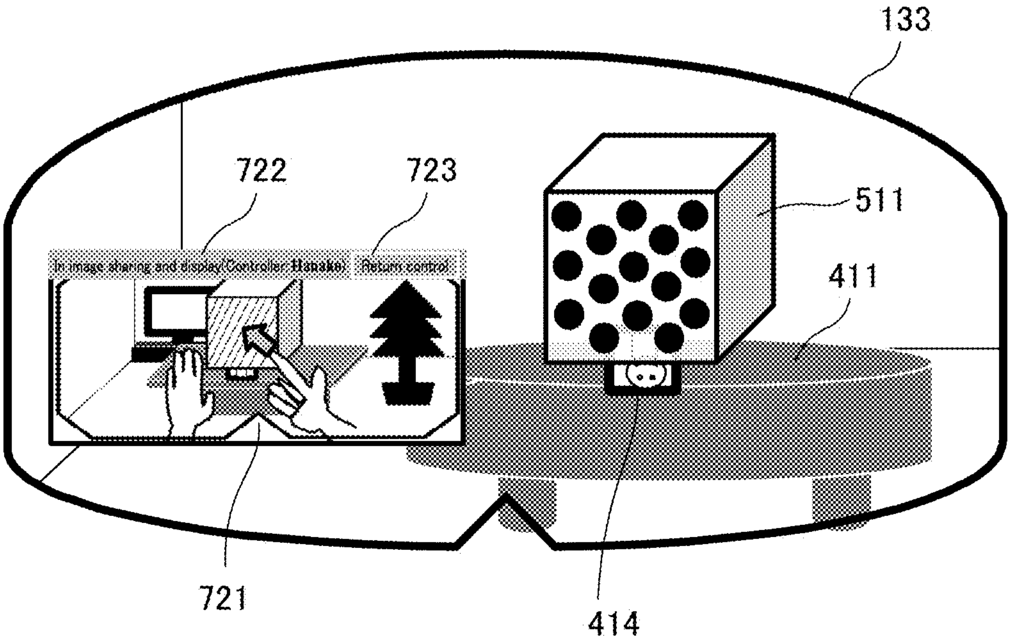

FIGS. 9A to 9C illustrate a display example when the same virtual object is shared using image sharing. FIGS. 9A to 9C illustrate a screen display example when a user name Hanako in the pulldown 613 in FIG. 8B is designated and the control authority is transferred thereto.

FIG. 9A illustrates a display example on the display unit 206 of the client terminal 131 after the control authority has been transferred. On the screen illustrated in FIG. 9A, a name of a controller having transferred the control authority is included in a message 701 indicating image sharing. That is, the user of the client terminal 131 can ascertain who the current controller is with reference to the message 701. On the screen illustrated in FIG. 9A, a control transfer button 702 which is the same as the control transfer button 612 is displayed for the purpose of change of the control transfer method or change of the control transfer destination. As a button for ending transfer of the control authority, a control return button 703 is also displayed on the screen. Since an operation of moving the virtual object 601 or the like is performed using the client terminal 131 in accordance with an instruction from the controller, an instructed position from the controller is indicated by a pointer 704 on the screen.

FIGS. 9B and 9C illustrate a display example on the display unit 206 of the client terminal 133 after the control authority has been transferred.

FIG. 9B illustrates a display example in which an image shared using image sharing is displayed on a full screen of the client terminal 133. The display unit 206 of the client terminal 133 is different from that of the client terminal 131 in shape, and thus an image sharing display screen 711 is displayed in as a large screen size as possible as illustrated in FIG. 9B. On the image sharing display screen 711, a message 712 indicating image sharing is displayed and controller information is also displayed on the screen similarly to the message 701. On the screen, a control return button 713 which is a button for returning the transferred control authority is displayed.

When the user of the client terminal 133 who is a controller touches a position of a virtual object on the image sharing display screen 711 with a hand 714, an operation on the touched virtual object is started. When the position of the virtual object is touched, a pointer 704 is displayed in the shared image. At this time, in image sharing, the virtual object on the image sharing display screen 711 can be touched on only a two-dimensional plane. Accordingly, when the virtual object is moved deeper or shallower, the terminal may receive an operation from the user by displaying an operation button (not illustrated) on another display unit 206.

FIG. 9C illustrates a display example in which an image shared using image sharing is reduced and displayed on the client terminal 133. On the screen illustrated in FIG. 9C, an image sharing display screen 721, a message 722, and a control return button 723 are the same as the image sharing display screen 711, the message 712, and the control return button 713 in FIG. 9B. At the time of reduction and display, a virtual object 511 which is drawn by the client terminal 133 is displayed. When a position of a virtual object in the image sharing display screen 721 is touched, the virtual object 501 is operated by the client terminal 131. On the other hand, when an operation of touching the position of the virtual object 511 with a hand or the like is performed, the virtual object 511 is operated by the client terminal 133.

Figure 10A:
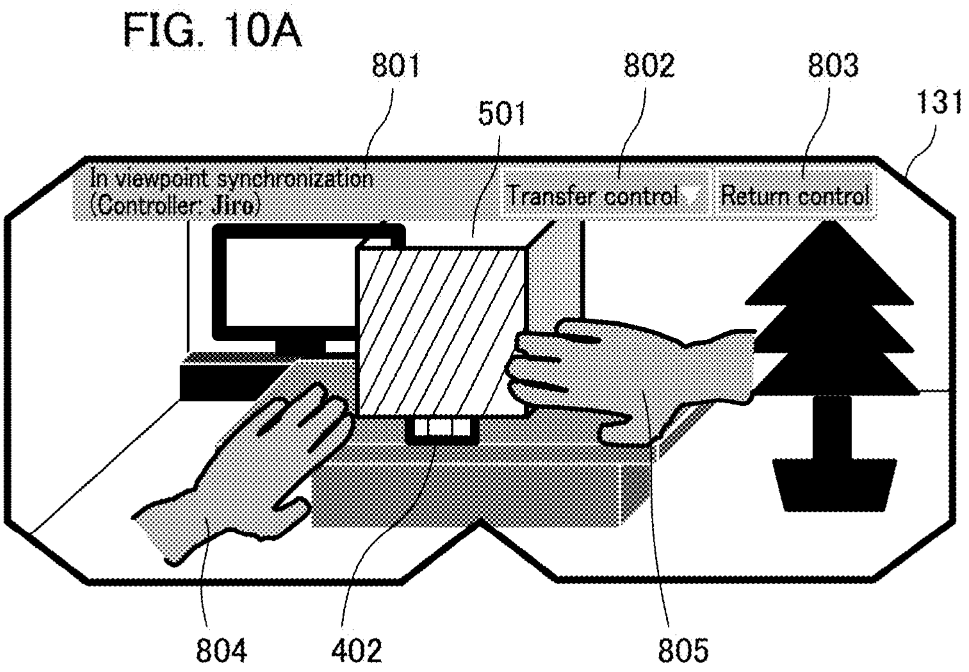
FIGS. 10A and 10B are diagrams illustrating a display example in viewpoint synchronization of the same virtual object.
Figure 10B:
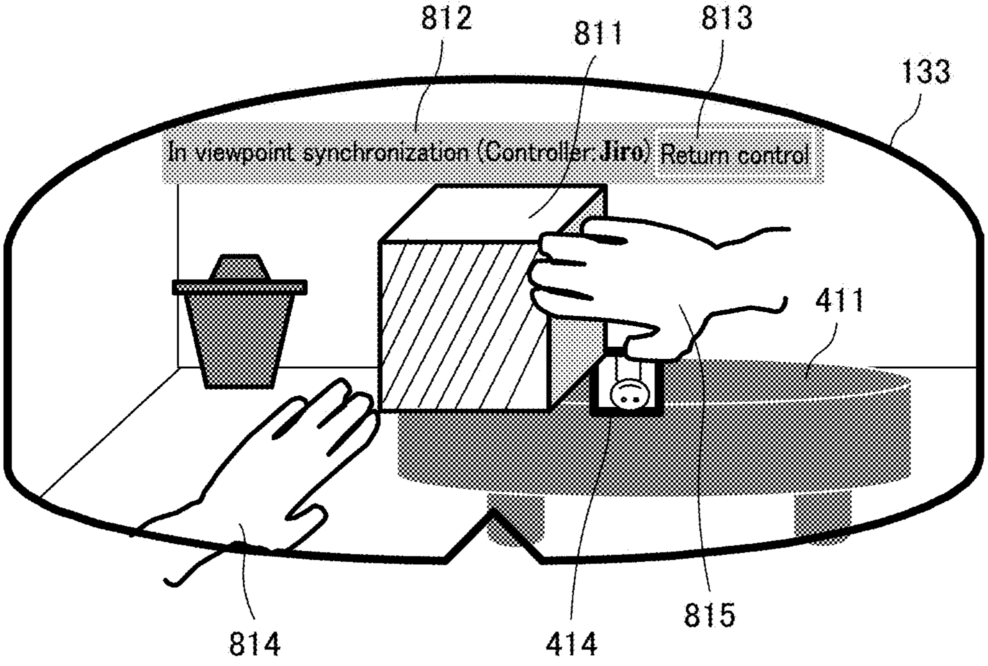

FIGS. 10A and 10B illustrate a display example in which the same virtual object is displayed using viewpoint synchronization. FIGS. 10A and 10B illustrate a screen display example when "automatic" is selected from the pulldown 623 in FIG. 8C in viewpoint synchronization and the control authority is transferred.

FIG. 10A is a display example on the display unit 206 of the client terminal 131 after the control authority has been transferred. On the screen illustrated in FIG. 10A, a name of a controller to which the control authority has been transferred is included in a message 801 indicating viewpoint synchronization. On the screen illustrated in FIG. 10A, a control transfer button 802 which is the same as the control transfer button 622 is displayed for the purpose of change of the control transfer method or change of the control transfer destination.

On the screen illustrated in FIG. 10A, a control return button 803 is displayed as a button for ending transfer of the control authority. Since an operation of moving the virtual object 601 or the like is performed using the client terminal 131 in accordance with an instruction from the controller, holograms 804 and 805 of the controller's hands are displayed on the screen.

The hologram of the controller's hand is a hologram of an image of the controller's hand captured by the imaging unit 207 of the client terminal 133 which is used by the controller. Hologram data is transmitted from the client terminal 133 to the client terminal 131 via the session managing unit 315 of the management server 121. Accordingly, the controller's hand imaged by the client terminal 133 is displayed as a hologram on the client terminal 131. Hologram display is used in this embodiment, but information indicating a touch position of the controller may be displayed using an alternative technique such as an avatar or a pointer.

FIG. 10B illustrates a display example on the display unit 206 of the client terminal 133 after the control authority has been transferred. On the screen illustrated in FIG. 10B, a virtual object 811 is displayed at the same point as the virtual object 501 using viewpoint synchronization. In the case of viewpoint synchronization, the relative position of the virtual object 501 in the client terminal 131 in FIG. 7A with respect to the virtual object 511 in FIG. 7B is reflected unlike image sharing. Accordingly, on the screen illustrated in FIG. 10B, there is no limitation of a display size due to a difference in glasses shape or the like. On the screen illustrated in FIG. 10B, the projected virtual object 811 is operated on the screen using the controller's hand 814 from the same viewpoint as the client terminal 131.

A series of operations until an anchor generated by the client terminal 131 is displayed on another client terminal 133 will be described below.

Figure 11:
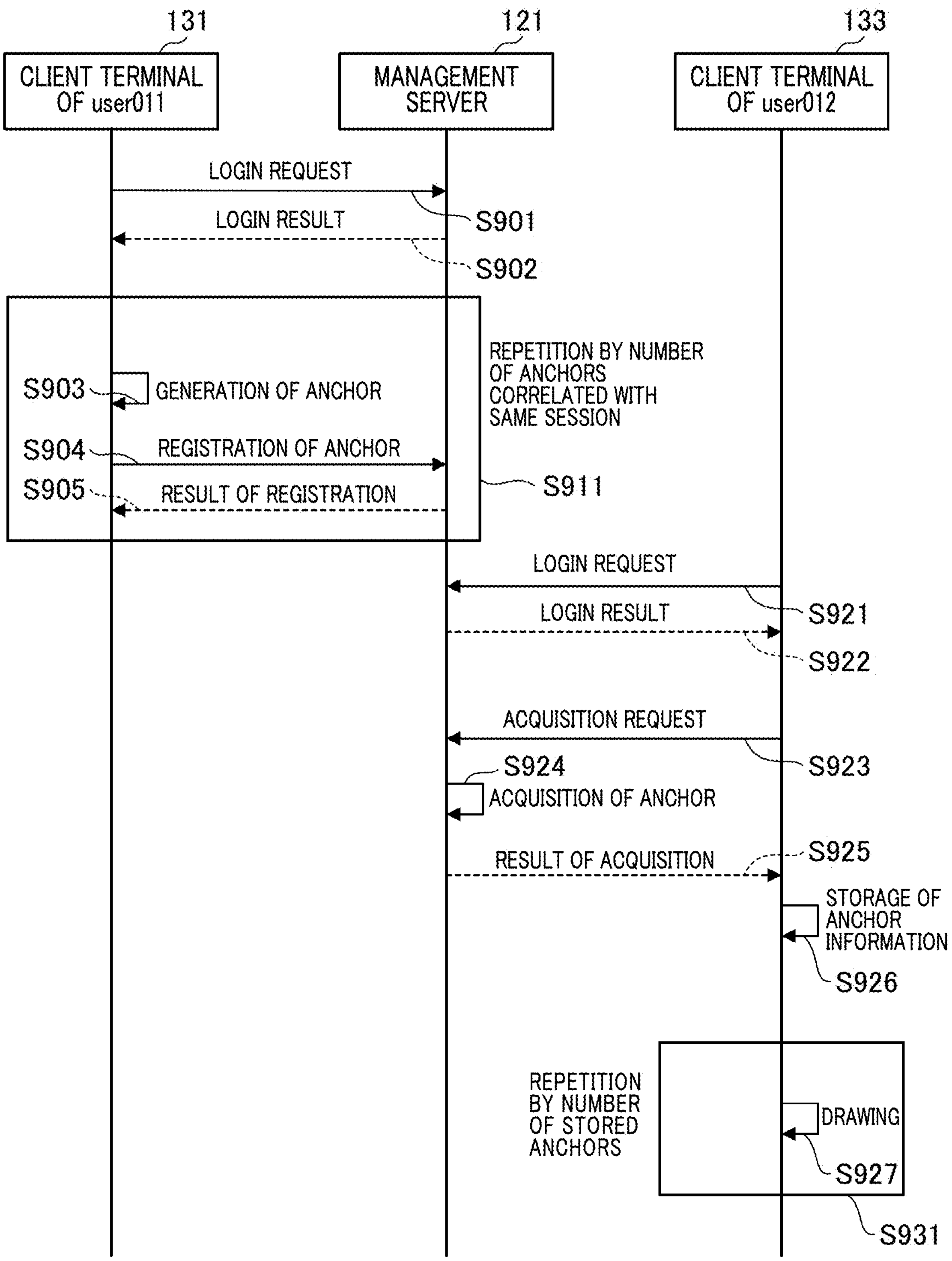
FIG. 11 is a diagram illustrating an operation example between each client terminal and an anchor management system according to the first embodiment.

FIG. 11 is a diagram illustrating an example of operations of the client terminal 131, the management server 121, and the client terminal 133 according to the first embodiment. FIG. 11 illustrates operations after an anchor generated by the client terminal 131 has been registered in the management server 121 (an anchor management server) and until the client terminal 133 acquires and displays the registered anchor.

In the following description, it is assumed that a user operating the client terminal 131 is User011 in Table 1 and a user operating the client terminal 133 is User012 in Table 1. The anchor which is registered by User011 operating the client terminal 131 is an anchor with an anchor ID anchor006 in FIG. 4.

S901 to S905 in FIG. 11 are operates until User011 operates the client terminal 131 to register the anchor.

When an operation from User011 is received, the client terminal 131 transmits a user ID and a password to the login processing unit 314 of the management server 121 via the login unit 304 (S901). At this time, it is assumed that User011 transmits a login request in a new session (S901) to the login processing unit 314 without designating an existing session ID.

The login processing unit 314 ascertains whether the user ID and the password of User011 match those managed in the user managing unit 313, determines that login succeeds when they match, and returns the login result to the client terminal 131 (S902). At this time, the login processing unit 314 adds a session with a new session ID Session005 issued by the session managing unit 315 to the login result.

The client terminal 131 of User011 correlates a virtual object stored in the virtual object data managing unit 301 with a projection position in the real world via the local anchor managing unit 306. Accordingly, the client terminal 131 generates an anchor and stores the anchor (S903).

The data communication unit 302 of the client terminal 131 transmits an anchor registration request of the generated anchor to the data communication unit 312 of the management server 121 (S904).

When the data communication unit 312 receives the anchor registration request, the management server 121 registers the received anchor via the anchor managing unit 311 and then returns the registration result to the data communication unit 302 of the client terminal 131 (S905).

When a plurality of anchors are registered as the same session ID, the processes of S903 to S905 are repeatedly performed (S911).

Figure 12A:
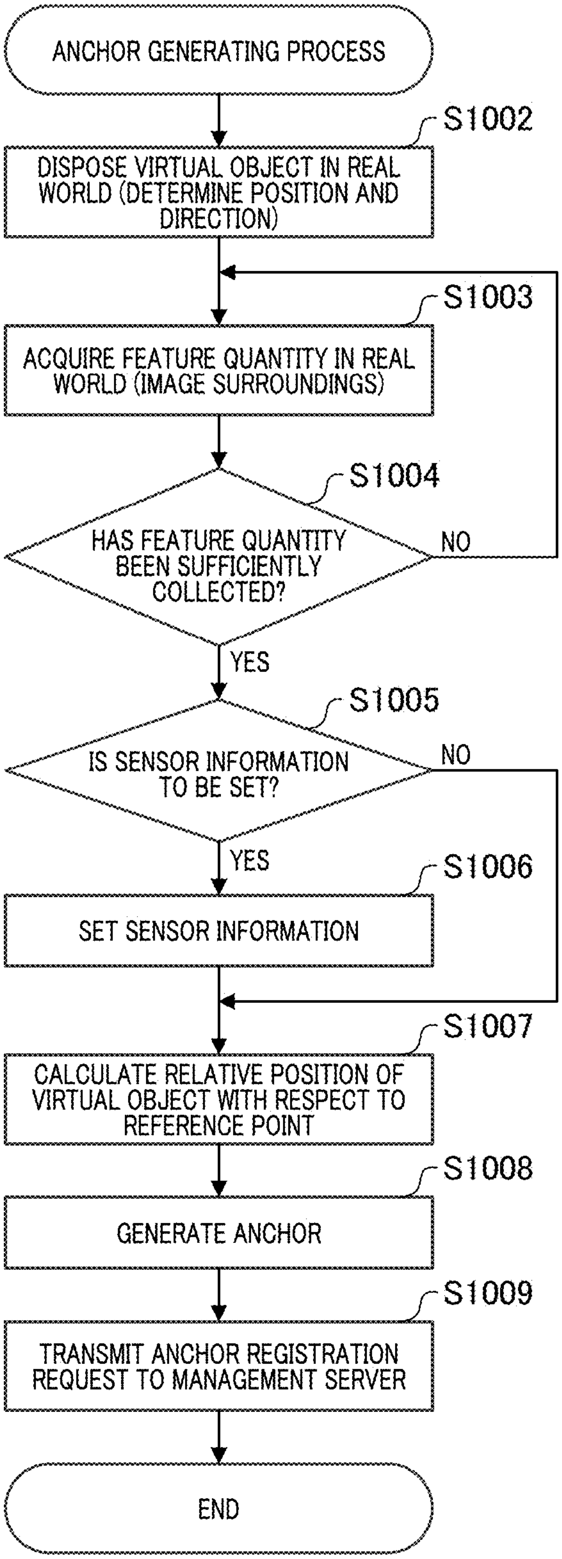
FIGS. 12A and 12B are flowcharts illustrating an operation example of an anchor generating process in FIG. 11.
Figure 12B:
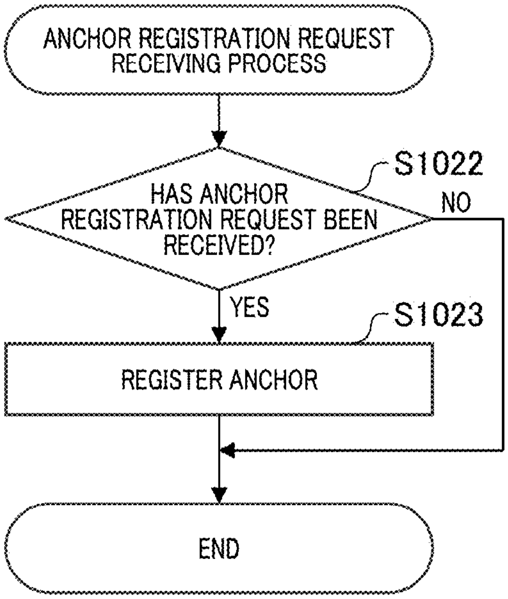

FIGS. 12A and 12B are flowcharts illustrating an operation example of an anchor generating process corresponding to S903 to S905 in FIG. 11.

FIG. 12A is a flowchart illustrating a routine on the client terminal 131 side in the anchor generating process. When the anchor generating process starts, the local anchor managing unit 306 determines a position and a direction of the virtual object in correlation with a projection position in the real world in accordance with a user's operation (S1002).

Then, the local anchor managing unit 306 images the surroundings of the client terminal 131 using the imaging unit 207 and acquires a three-dimensional feature quantity in the real world (S1003). The client terminal 131 determines whether the feature quantity is sufficiently collected (S1004). When it is determined in S1004 that the feature quantity is not sufficiently collected, the client terminal 131 acquires the feature quantity in S1003 again.

When it is determined in S1003 that the feature quantity is sufficiently collected, the client terminal 131 calculates a central point which is the center of positions of a plurality of feature points from the positions. Then, the client terminal 131 adds the central point calculated as a three-dimensional reference point in the real world of the anchor to information of the feature quantity.

The client terminal 131 determines whether sensor information is to be set for the anchor (S1005). When sensor information is not to be set for the anchor, the routine proceeds to S1007. On the other hand, when sensor information is to be set for the anchor, the local anchor managing unit 306 performs setting corresponding to a type of a sensor on the basis of an input from the user (S1006). For example, in S1006, the local anchor managing unit 306 correlates the information of the anchor with Beacon id=123 in accordance with the user's operation.

Subsequently, the client terminal 131 calculates a relative position of the virtual object with respect to the reference point using the reference point calculated in S1003 (S1007). Then, the client terminal 131 generates an anchor on the basis of the information acquired in S1002 to S1007 (S1008). Thereafter, the data communication unit 302 of the client terminal 131 transmits an anchor registration request of the generated anchor to the management server 121 (S1009). In this way, the anchor generating process in the client terminal 131 ends.

FIG. 12B is a flowchart illustrating a routine on the management server 121 side in the anchor generating process.

The data communication unit 312 of the management server 121 determines whether an anchor registration request has been received from the client terminal 131 (S1022). When an anchor registration request has been received, the anchor managing unit 311 registers the anchor on the basis of the anchor registration request (S1023), and then the routine ends. On the other hand, when an anchor registration request has not been received, the data communication unit 312 ends the routine and waits for reception of an anchor registration request. In this way, the anchor generating process in the management server 121 ends.

Referring back to FIG. 11, S921 to S927 in FIG. 11 are operations when User012 operates the client terminal 133 to acquire and draw an anchor. In the following example, it is assumed that User011 and User012 are located at separated places. Accordingly, in the following example, it is assumed that the sensor information set in S1006 is not used and User012 designates a session ID and acquires an anchor.

When an operation of User012 is received, the client terminal 133 transmits a user ID and a password to the login processing unit 314 of the management server 121 via the login unit 304 (S921). At this time, it is assumed that User012 designates a session with an existing session ID Session005 and transmits a login request (S921) to the login processing unit 314.

The login processing unit 314 ascertains whether the user ID and the password of User012 match those managed by the user managing unit 313, determines that login has succeeded when they match, and returns the login result to the client terminal 133 (S922).

The local anchor managing unit 306 of the client terminal 133 transmits an acquisition request of an anchor correlated with the session ID Session005 to the data communication unit 312 along with information of User012 of the login user ID (S923).

The data communication unit 312 of the management server 121 acquires the anchor correlated with the session ID Session005 from the anchor managing unit 311 (S924). Then, the data communication unit 312 returns the acquisition result of the anchor to the data communication unit 302 of the client terminal 133 (S925).

Then, the data communication unit 302 of the client terminal 133 stores the anchor returned from the data communication unit 312 via the local anchor managing unit 306 (S926). Then, the anchor drawing unit 303 performs an anchor drawing process (S927). The anchor drawing process of S927 is repeatedly performed by the number of anchors stored in the local anchor managing unit 306 (S931).

Figure 13:
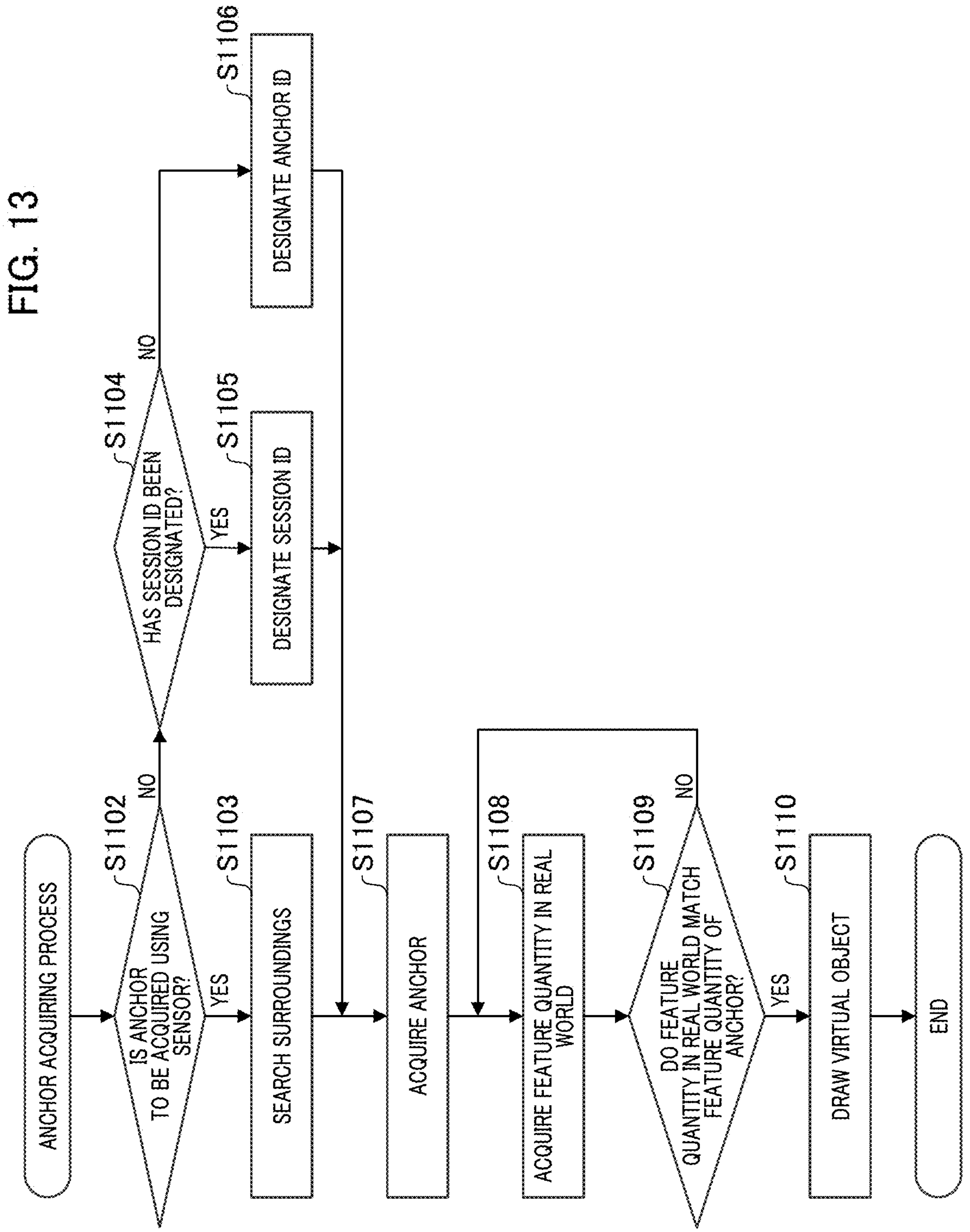
FIG. 13 is a flowchart illustrating an operation example of an anchor acquiring process in FIG. 11.

FIG. 13 is a flowchart illustrating an operation example of the client terminal 133 in the anchor acquiring process (S923 to S927) of FIG. 11.

First, the local anchor managing unit 306 of the client terminal 133 determines whether an anchor is to be acquired using a sensor in accordance with the user's designation (S1102). When an anchor is to be acquired using a sensor (YES in S1102), the client terminal 133 searches Beacon or WiFi sensors of in the surroundings (51103). Accordingly, the client terminal 133 can acquire a plurality of anchors correlated with the sensor information. Thereafter, the routine proceeds to S1107.

When an anchor is not acquired using a sensor (NO in S1102), the local anchor managing unit 306 determines whether a session ID has been designated in accordance with the user's designation (S1104). When a session ID has been designated (YES in S1104), the local anchor managing unit 306 designates a session ID at the time of acquisition of the anchor (S1105). Accordingly, the client terminal 133 can acquire a plurality of anchors correlated with the session ID. Thereafter, the routine proceeds to S1107.

When a session ID has not been designated (NO in S1104), the local anchor managing unit 306 designates an anchor ID at the time of acquisition of the anchor (S1106). Accordingly, the client terminal 133 can acquire an anchor correlated with the session ID. At the time of designation of an anchor ID, the user may designate a plurality of anchor IDs. In this case, the client terminal 133 can acquire a plurality of anchors correlated with the designated anchor ID.

The client terminal 133 transmits an anchor acquisition request to the management server 121 and acquires an anchor (S1107). Thereafter, the local anchor managing unit 306 images the surroundings of the client terminal 133 using the imaging unit 207 and acquires a three-dimensional feature quantity in the real world (S1108). The process of S1108 is the same as the process of S1003 in FIG. 12A and description thereof will not be repeated.

The client terminal 133 determines whether there is an anchor matching the acquired feature quantity by comparing the acquired feature quantity with the feature quantity correlated with the anchor (S1109). When there is no anchor matching the acquired feature quantity (NO in S1109), the routine returns to S1108 and the local anchor managing unit 306 acquires the three-dimensional feature quantity in the real world again.

On the other hand, when there is an anchor matching the acquired feature quantity (YES in S1109), the anchor drawing unit 303 draws a virtual object to overlap an image obtained by imaging the real world (S1110). In the drawing process of S1110, a drawing position of the virtual object in the client terminal 133 is determined using the "reference point included in the feature quantity" of the anchor acquired in S1107 and "virtual object position information indicating the relative position to the reference point."

In this way, the routine illustrated in FIG. 13 ends.

Figure 14:
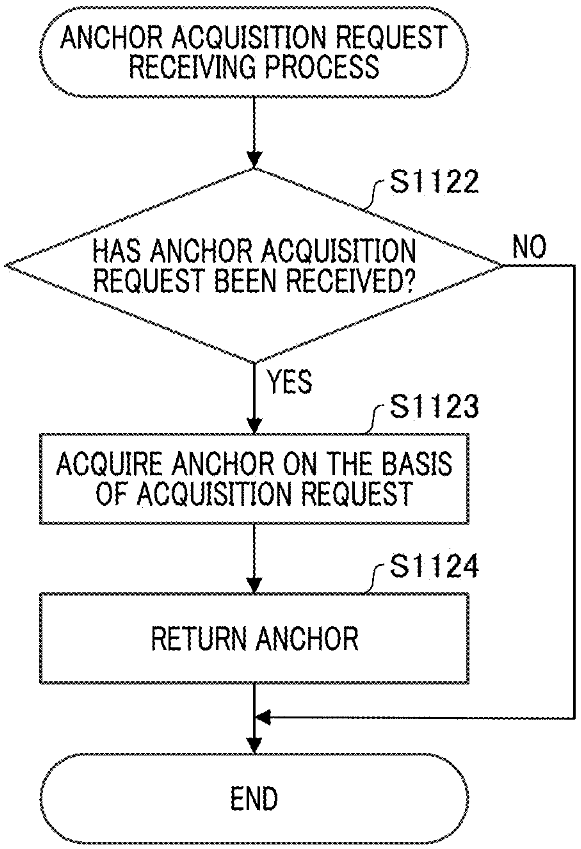
FIG. 14 is a flowchart illustrating an operation example of the anchor acquiring process in FIG. 11.

FIG. 14 is a flowchart illustrating an operation example of the management server 121 in the anchor acquiring process (S923 to S927) illustrated in FIG. 11.

The management server 121 determines whether the data communication unit 312 has received an anchor acquisition request (S1122). When an anchor acquisition request has not been received (NO in S1122), the routine illustrated in FIG. 14 ends. On the other hand, when an anchor acquisition request has been received (YES in S1122), the routine proceeds to S1123.

The data communication unit 312 acquires an anchor from the anchor managing unit 311 based on the anchor acquisition request (S1123). Then, the data communication unit 312 returns the acquired anchor to the data communication unit 302 of the client terminal 133 (S1124).

In this way, the routine illustrated in FIG. 14 ends.

An anchor updating process when a position of a virtual object is changed will be described below with reference to FIGS. 15 and 16.

Figure 15:
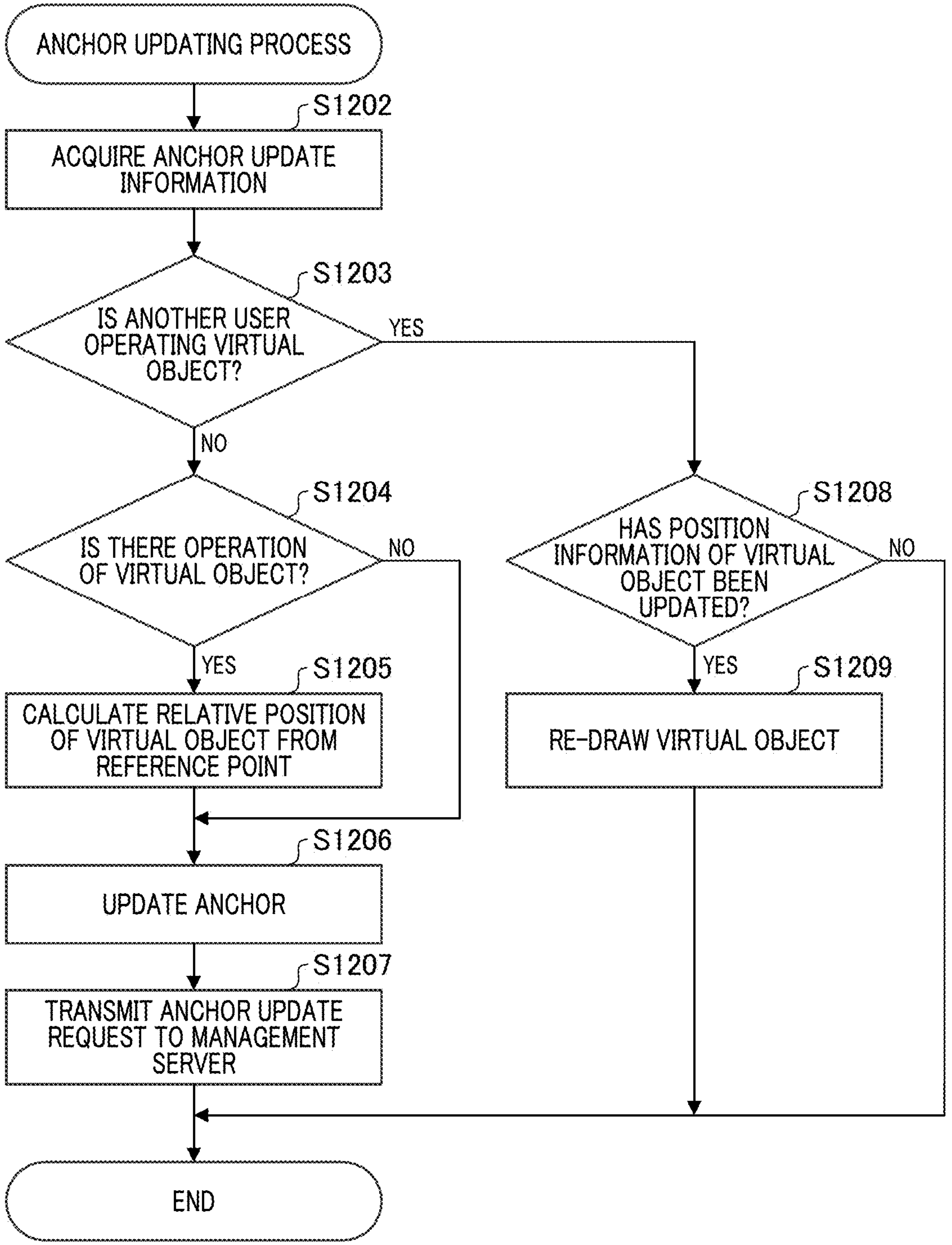
FIG. 15 is a flowchart illustrating an operation example in a client terminal in an anchor updating process.

FIG. 15 is a flowchart illustrating an operation example of the client terminals 131 to 133 in the anchor updating process.

A client terminal acquires anchor update information from the management server 121 before updating an anchor therein (S1202). The anchor update information is generated when a projection position of a virtual object is changed by another client terminal and the virtual object position information in FIG. 4 is updated. It is assumed that the anchor update information includes information of a difference from previous anchor information. By acquiring the anchor update information, the client terminal can ascertain whether an anchor has been updated by another client terminal.

An acquisition request of the anchor update information may be transmitted from the corresponding client terminal to the management server 121 using periodic polling or using another method. For example, when an anchor update request is received from an arbitrary client terminal, the management server 121 identifies a login user to a session correlated with a session ID from the session information (FIG. 5). Then, the client terminal may acquire the update information by transmitting a push notification from the client terminals 131 to 133 which are used by the login user to the management server 121.

The client terminal determines whether the virtual object is being operated by another user (another client terminal) based on the acquired anchor update information (S1203). In determining whether the virtual object is being operated by another user, the client terminal ascertains information of an operator included in the anchor information (FIG. 4). When the virtual object is not being operated by another user, the client terminal can operate the position or direction of the virtual object projected on the real world, for example, by performing an operation of touching the virtual object as if it were an object in the real world.

When the virtual object is not being operated by another user (NO in S1203), the routine proceeds to S1204. On the other hand, when the virtual object is being operated by another user (YES in S1203), the routine proceeds to S1208.

When the virtual object is not being operated by another user (NO in S1203), the client terminal determines whether an operation of changing the position or direction of the virtual object has been received (S1204). When the operation has not been received (NO in S1204), the routine proceeds to S1206. On the other hand, when the operation has been received, the client terminal calculates a relative position of the virtual object on which the operation has been performed with respect to the reference point (S1205).

The client terminal updates the virtual object position information of the anchor information (FIG. 4) (S1206). Then, the client terminal transmits an anchor update request to the management server 121 (S1207). Therefore, the routine illustrated in FIG. 15 ends.

When the operation of charging the position or direction of the virtual object has not been received, the virtual object position information is not changed in S1206. On the other hand, when the operation of changing the position or direction of the virtual object has been received, the virtual object position information is changed to information in which the position or direction of the virtual object on which the operation has been performed in S1206.

On the other hand, when the virtual object is being operated by another user (YES in S1203), the client terminal determines whether the virtual object position information has been updated by ascertaining the anchor information (FIG. 4) (S1208). When the virtual object position information has not been updated (NO in S1208), the routine illustrated in FIG. 15 ends.

On the other hand, when the virtual object position information has been updated (YES in S1208), the anchor drawing unit 303 of the client terminal draws the virtual object again based on the updated virtual object position information (S1209). Thereafter, the routine illustrated in FIG. 15 ends.

Figure 16:
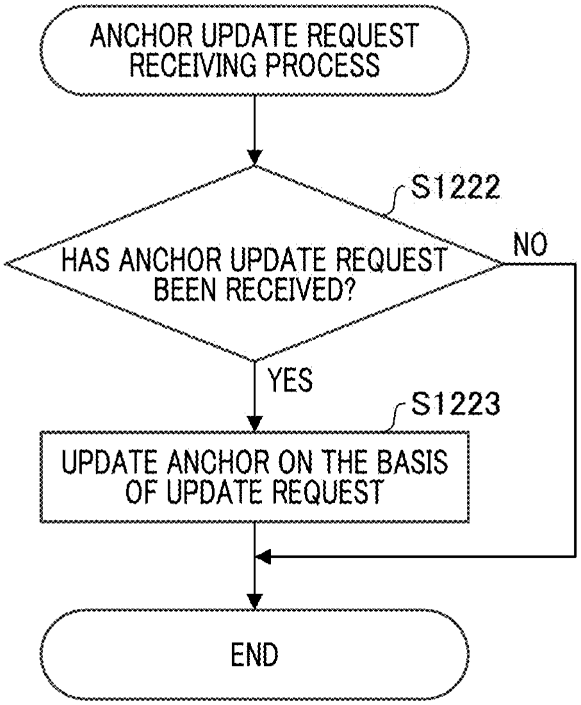
FIG. 16 is a flowchart illustrating an operation example in the virtual object management system in the anchor updating process.

FIG. 16 is a flowchart illustrating an operation example of the management server 121 in the anchor updating process.

The management server 121 determines whether an anchor update request has been received from a client terminal (S1222). When an anchor update request has not been received (NO in S1222), the routine illustrated in FIG. 16 ends. On the other hand, when an anchor update request has been received (YES in S1222), the anchor managing unit 311 updates the anchor based on the update request (S1223). Thereafter, the routine illustrated in FIG. 16 ends.

In this embodiment, an acquisition request of anchor update information is transmitted from the client terminals 131 to 133 to the management server 121. For example, the management server 121 acquires the anchor update information using periodic polling. When a push notification of update information is transmitted by the management server 121, the management server 121 may transmit the push notification to the client terminals after S1223.

An operation example from starting of a presentation to ending of the presentation in a client terminal of a presentation user will be described below with reference to FIGS. 17 to 20.

Figure 17:
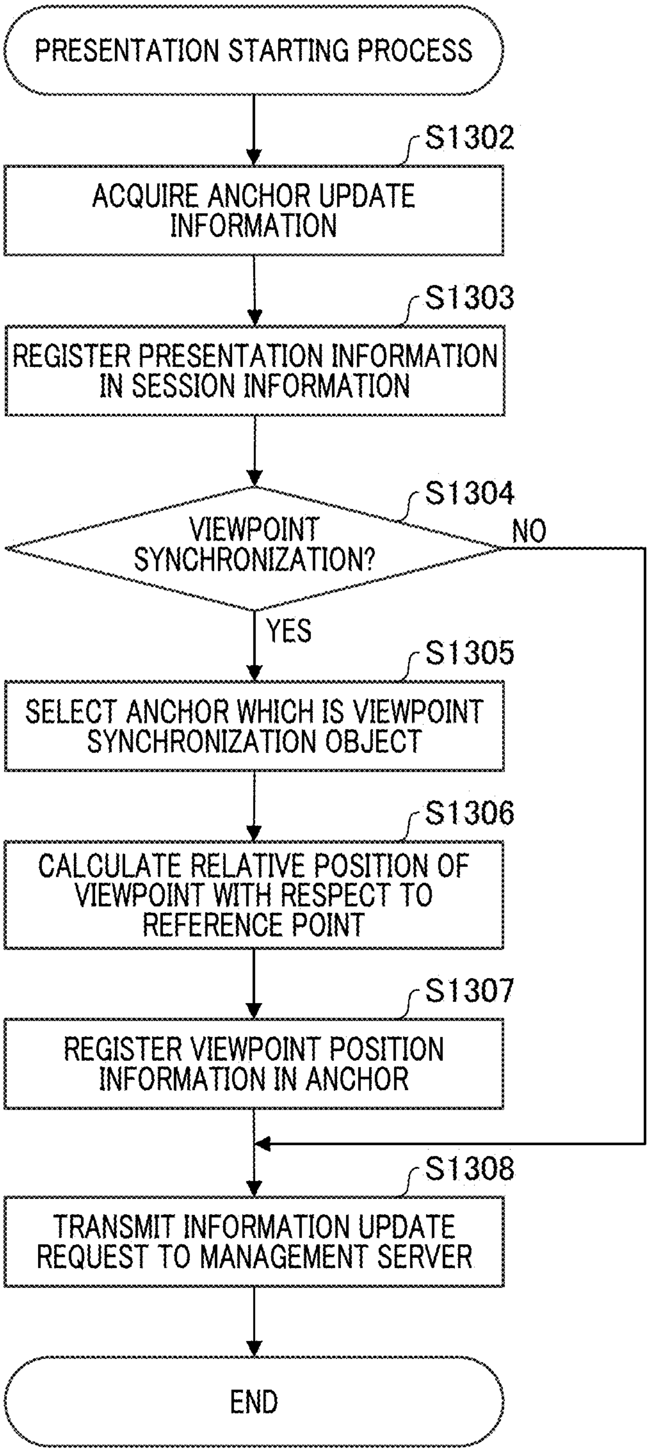
FIG. 17 is a flowchart illustrating an operation example when a presentation user starts a presentation.

FIG. 17 is a flowchart illustrating an operation example at the time of starting of a presentation by a presentation user.

First, the client terminal of the presentation user acquires update information of session information and anchor information (S1302). Then, the client terminal of the presentation user performs a process of registering a presenter and a presentation method in correlation with a session ID of a currently executed session in a record of the session in the session information (FIG. 5) (S1303).

Then client terminal of the presentation user determines whether the presentation method is viewpoint synchronization (S1304). When the presentation method is viewpoint synchronization (YES in S1304), the routine proceeds to S1305. On the other hand, when the presentation method is not viewpoint synchronization (NO in S1304), this corresponds to a presentation using image sharing, and the routine proceeds S1308 in this case.

When the presentation method is viewpoint synchronization (YES in S1304), the client terminal of the presentation user selects an anchor which is a viewpoint synchronization object based on an instruction from the presentation user (S1305). The anchor which is a viewpoint synchronization object is selected out of anchors correlated with the session ID of the currently executed session in the anchor information (FIG. 4). When the anchor which is a viewpoint synchronization object is selected in S1305, a flag ("0") indicating a viewpoint synchronization object is assigned to an item of the viewpoint synchronization object in the record of the corresponding anchor in the anchor information (FIG. 4).

The client terminal of the presentation user calculates relative positions of the viewpoint of the presentation user with respect to the "reference point included in the feature quantity of the anchor" for a plurality of selected anchors (S1306). Then, the client terminal of the presentation user performs a process of registering the calculated relative positions in the viewpoint position information of the anchor information (FIG. 4) (S1307).

Thereafter, the client terminal of the presentation user transmits an update request of session information and anchor information to the management server 121 (S1308). When the presentation method is imaging sharing (NO in S1304), the client terminal requests updating of session information updated in S1303 in S1308. Thereafter, the routine illustrated in FIG. 17 ends.

Figure 18:
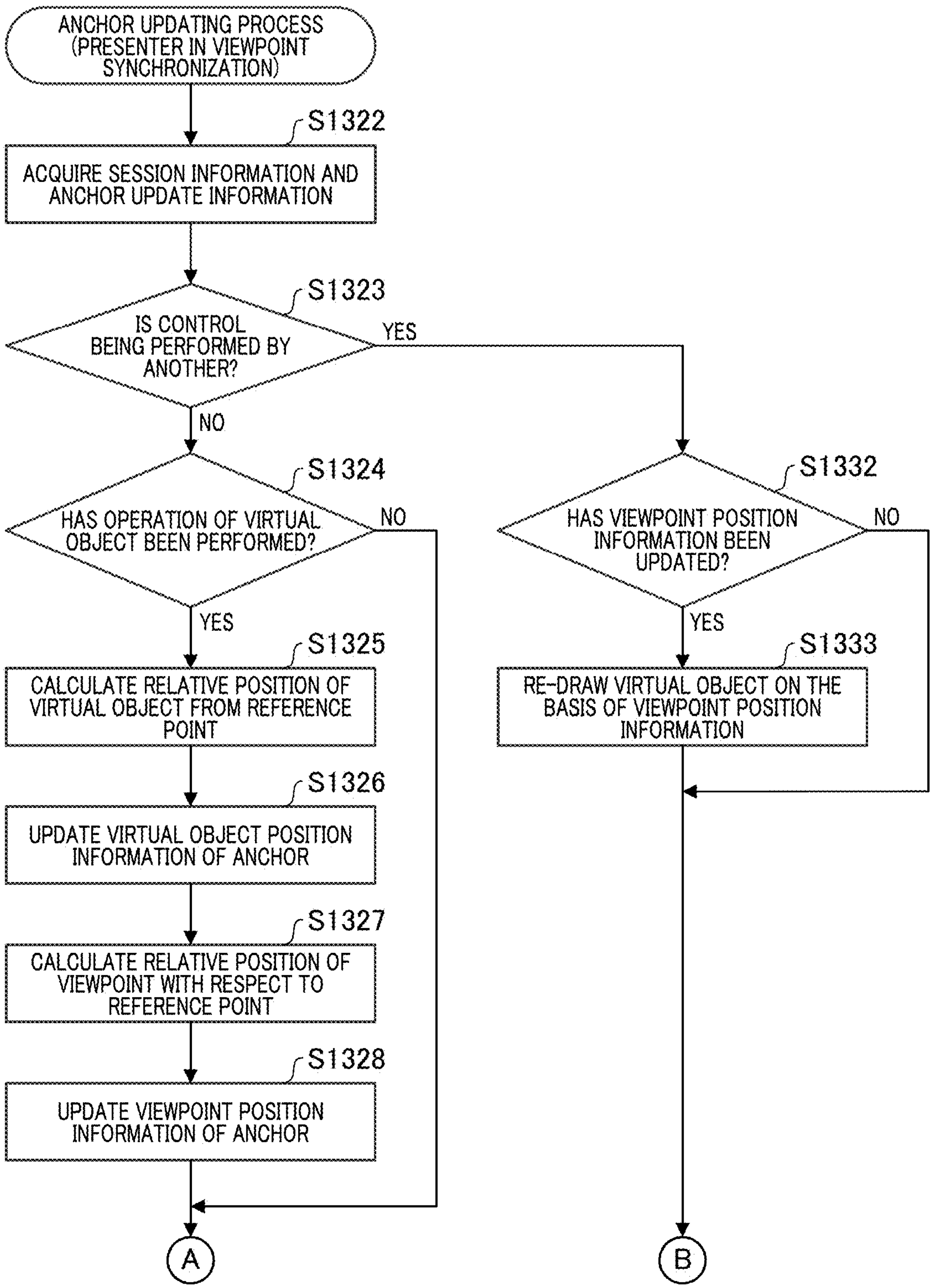
FIG. 18 is a flowchart illustrating an operation example of an anchor updating process when a position of a virtual object is changed by a presentation user's operation.
Figure 19:
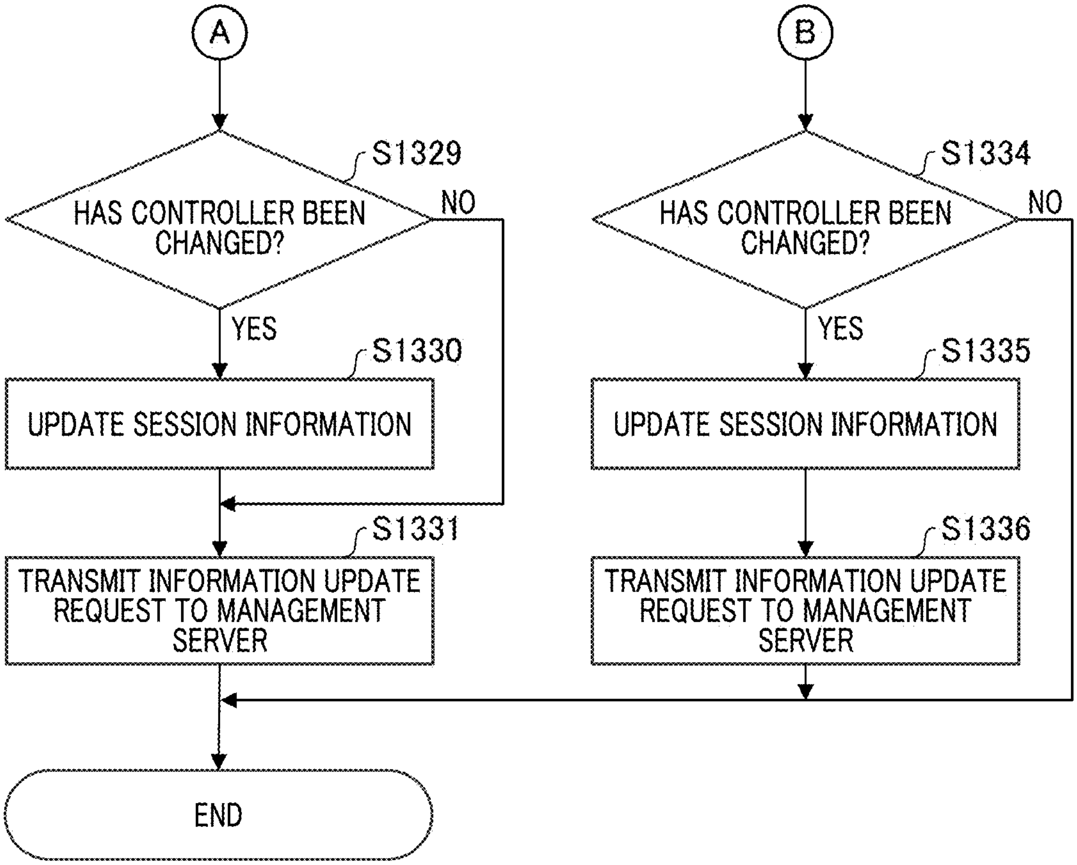
FIG. 19 is a flowchart subsequent to FIG. 18.

FIGS. 18 and 19 are flowcharts illustrating an operation example of the anchor updating process when a position of a virtual object is changed by a presentation user's operation during a presentation.

First, similarly to S1302 in FIG. 17, a client terminal of a presentation user acquires update information of session information and anchor information (S1322). The client terminal of the presentation user determines whether the virtual object is being operated by another user (another client terminal) with reference to a controller of the acquired session (S1323).

When the virtual object is not being operated by another user (NO in S1323), the routine proceeds to S1324. On the other hand, when the virtual object is being operated by another user (YES in S1323), the routine proceeds to S1332.

When the virtual object is not being operated by another user (NO in S1323), the client terminal of the presentation user determines whether an operation of changing the position or direction of the virtual object has been received (S1324). When the operation has not been received (NO in S1324), the routine proceeds to S1329. On the other hand, when the operation has been received, the client terminal of the presentation user calculates a relative position of the operated virtual object with respect to the reference point (S1325). Then, the client terminal of the presentation user performs a process of updating the position information of the virtual object in the anchor information (FIG. 4) (S1326).

Subsequently, the client terminal of the presentation user calculates the relative position of a viewpoint of the presentation user with respect to the reference point for each anchor (S1327). Then, the client terminal of the presentation user performs a process of registering the calculated relative position in the viewpoint position information in the anchor information (FIG. 4) (S1328).

The client terminal of the presentation user determines whether an instruction to change a controller has been input by the presentation user (S1329). When an instruction to change a controller has not been input (NO in S1329), the routine proceeds to S1331. On the other hand, when an instruction to change a controller has been input (YES in S1329), the client terminal of the presentation user updates the controller in the session information (FIG. 5) (S1330). The client terminal of the presentation user transmits an update request of session information and anchor information to the management server 121 (S1331). Thereafter, the routines illustrated in FIGS. 18 and 19 end.

On the other hand, when the virtual object is being operated by another user (YES in S1323), the client terminal of the presentation user determines whether the viewpoint position information in the update information of the anchor information (FIG. 4) acquired in S1322 has been updated (S1332). When the viewpoint position information has not been updated (NO in S1332), the routine proceeds to S1334. On the other hand, when the viewpoint position information has been updated (YES in S1332), the anchor drawing unit 303 re-draws the virtual object based on the update information of the viewpoint position information (S1333).

When the virtual object is being operated by another user, the viewpoint position information of the anchor information (FIG. 4) is updated based on a relative position of a "controller viewpoint" with respect to the "reference point included in the anchor feature quantity." The viewpoint position information of the anchor information (FIG. 4) is updated based on a relative position of a presentation user viewpoint before the presentation user transfers the control authority to another user and is updated based on a relative position of the controller viewpoint after the presentation user transfers the control authority to another user. The method of updating the viewpoint position information based on the relative position of the presentation user viewpoint may also be used after the control authority has been transferred. In this case, there is a likelihood that the presentation user will change the viewpoint while the controller is changing the virtual object and it will be difficult to operate the virtual object.

Subsequently, the client terminal of the presentation user determines whether an instruction to change a controller has been input by the presentation user (S1334). When an instruction to change a controller has not been input (NO in S1334), the routine illustrated in FIGS. 18 and 19 ends.

On the other hand, when an instruction to change a controller has been input (YES in S1334), the client terminal of the presentation user updates the controller in the session information (FIG. 5) (S1335). The client terminal of the presentation user transmits an update request of session information and anchor information to the management server 121 (S1336). Thereafter, the routines illustrated in FIGS. 18 and 19 end.

Figure 20:
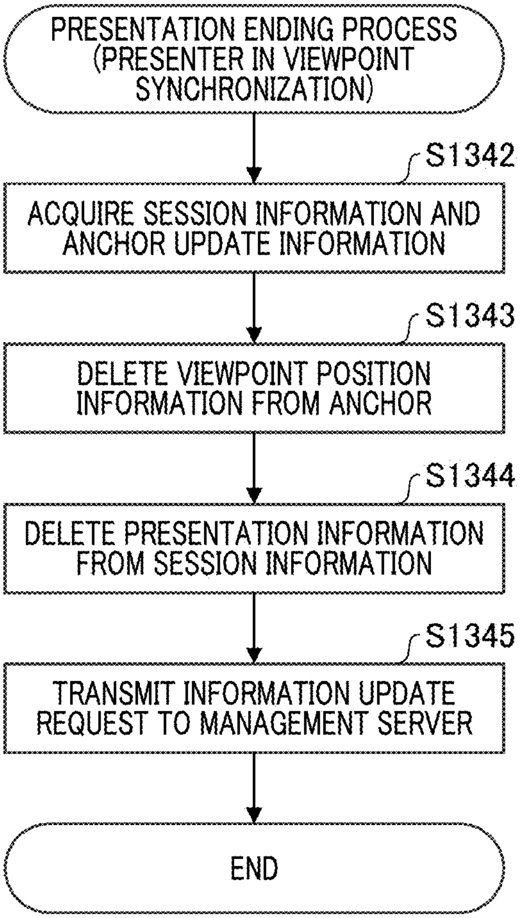
FIG. 20 is a flowchart illustrating an operation example when a presentation user ends a presentation.

FIG. 20 is a flowchart illustrating an operation example when a presentation by a presentation user ends.

First, similarly to S1302 in FIG. 17, the client terminal of the presentation user acquires update information of session information and anchor information (S1342). Then, the client terminal of the presentation user deletes data of the viewpoint synchronization object and the viewpoint position information from the record of the presented anchor included in the anchor information (FIG. 4) (S1343).

Subsequently, the client terminal of the presentation user deletes information of the presenter, the attendant, the presentation method, the control transfer method, and the controller associated with the presentation from the record of the presented session ID included in session information (FIG. 5) (S1344). Finally, the client terminal of the presentation user transmits an update request of session information and anchor information to the management server 121 (S1345). Thereafter, the routine illustrated in FIG. 20 ends.

An operation example from a presentation attendance start to a presentation withdrawal end in a client terminal of a presentation-attendance user will be described below with reference to FIGS. 21 to 24.

Figure 21:
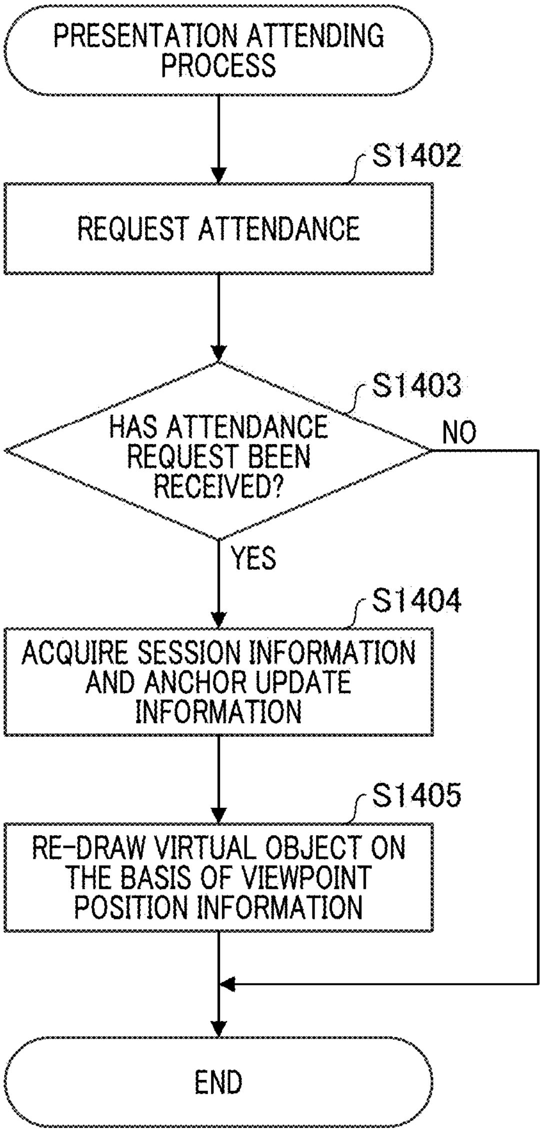
FIG. 21 is a flowchart illustrating an operation example when a presentation-attendance user starts presentation attendance.

FIG. 21 is a flowchart illustrating an operation example at the time of the presentation attendance start by a presentation-attendance user.

First, a client terminal of a user who desires attendance designates a session ID of a session which is executed therein and transmits a presentation attendance request for the session ID to the management server 121 (S1402).

When the data communication unit 312 receives an attendance request of the presentation, the management server 121 adds a corresponding user ID as an attendant of the session information (FIG. 5) via the session managing unit 315 based on the session ID and the user ID included in the attendance request. Then, the management server 121 adds the corresponding user ID as an attendant and then returns a processing result of the attendance request to the client terminal which is a request source via the data communication unit 312.

The client terminal of the presentation-attendance user receives the processing result of the attendance request and determines whether the attendance request has been accepted by the management server 121 (S1403). When the attendance request has not been accepted (NO in S1403), the routine illustrated in FIG. 21 ends.

On the other hand, when the attendance request has been accepted (YES in S1403), the client terminal of the presentation-attendance user acquires update information of session information and anchor information from the management server 121 (S1404).

Then, the client terminal of the presentation-attendance user re-draws the virtual object of the target anchor based on the viewpoint position information of the acquired anchor information (FIG. 4) (S1405). In the process of S1405, re-drawing the virtual object is performed based on the viewpoint position information of the anchor to which the flag ("0") of the viewpoint synchronization object is given. Thereafter, the routine illustrated in FIG. 21 ends.

Here, the client terminal of the presentation-attendance user excludes a virtual object of an anchor other than the anchor of the viewpoint synchronization object out of the virtual objects drawn with its own session ID before the presentation from the viewpoint synchronization object after the presentation and does not display the virtual object. The anchor of the viewpoint synchronization object can be added or deleted later during the presentation from the client terminal to the management server 121 by the presentation-attendance user or a controller to which the presentation user has transferred the control authority.

Through re-drawing in S1405, the virtual object drawn from the viewpoint of the presentation-attendance user is drawn before the presentation attendance and is re-drawn from a "viewpoint of the presentation user" or a "viewpoint of the controller to which the presentation user has transferred the control authority" after the presentation attendance. As a result, all the presentation attendants can see the virtual object from the same viewpoint.

Figure 22:
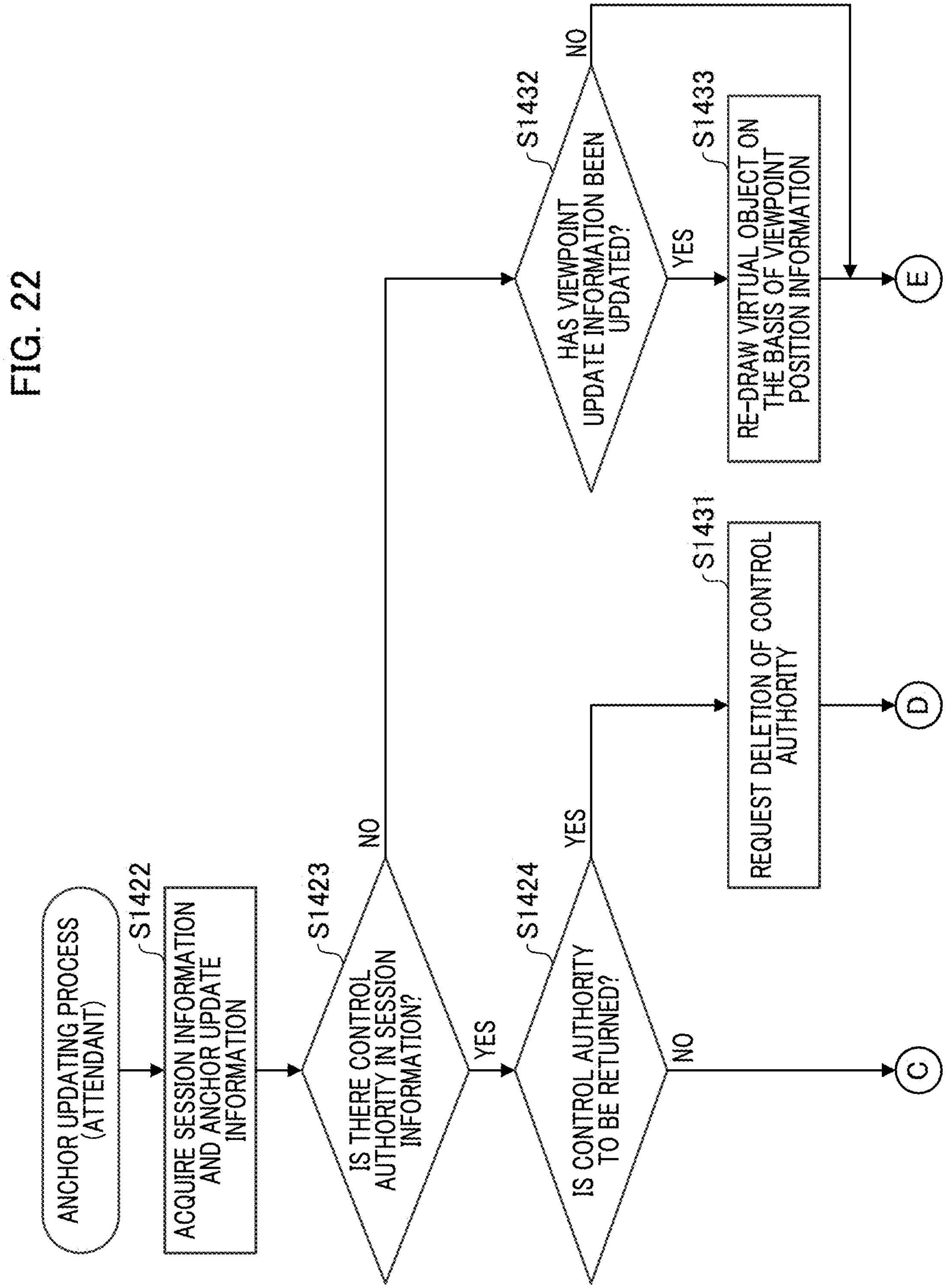
FIG. 22 is a flowchart illustrating an operation example of an anchor updating process when a position of a virtual object is changed by a presentation-attendance user's operation.
Figure 23:
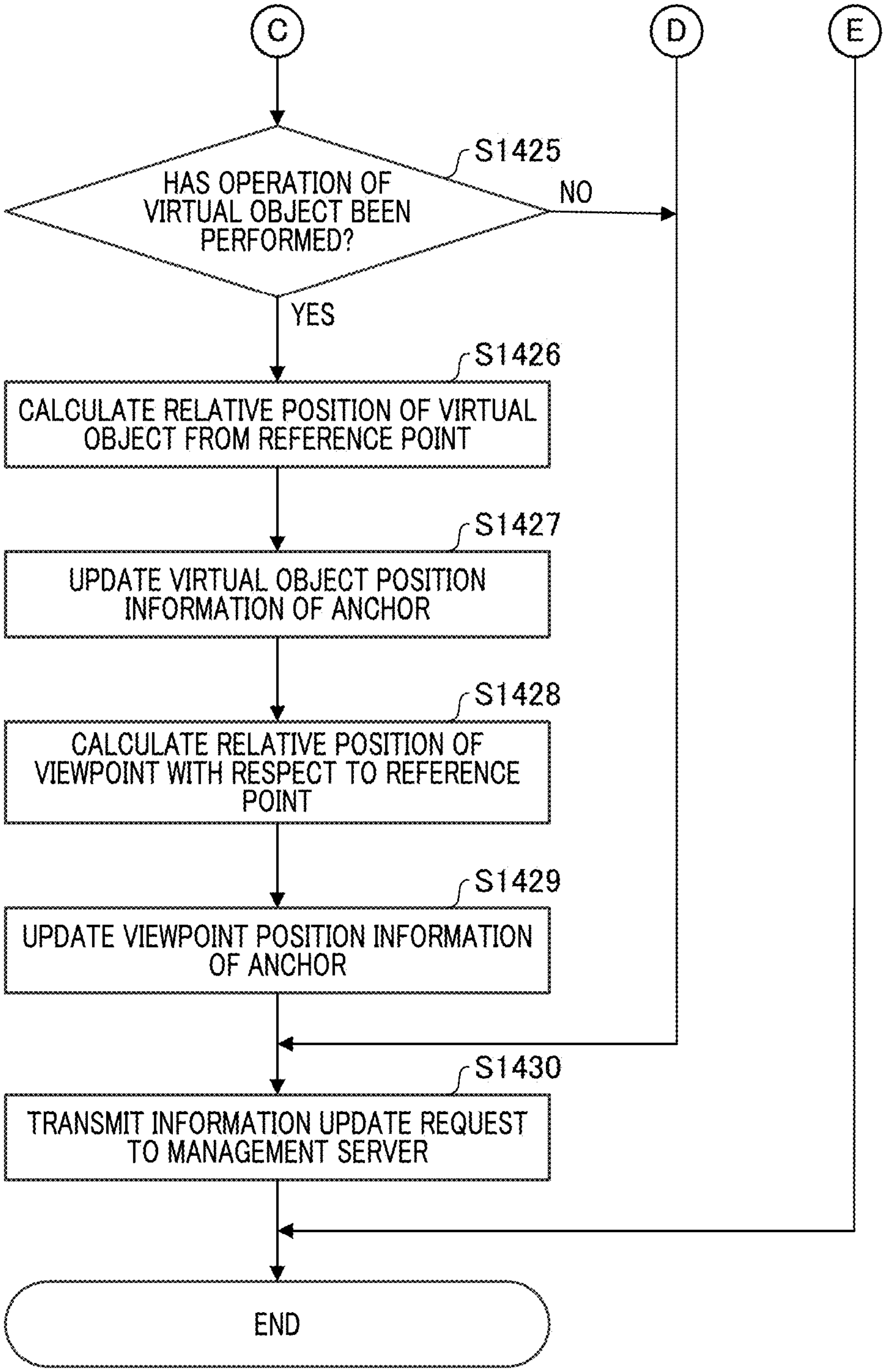
FIG. 23 is a flowchart subsequent to FIG. 22.

FIGS. 22 and 23 are flowcharts illustrating an operation example of the anchor updating process when a position of a virtual object is changed by a presentation-attendance user's operation.

First, the client terminal of the presentation-attendance user acquires update information of the session information and the anchor information from the management server 121 (S1422). Then, the client terminal of the presentation-attendance user determines whether a controller is the presentation-attendance user with reference to the controller of the acquired session information (FIG. 5) (S1423). When a controller is the presentation-attendance user (YES in S1423), the routine proceeds to S1424. On the other hand, when a controller is not the presentation-attendance user (NO in S1423), the routine proceeds to S1432.

When a controller is the presentation-attendance user (YES in S1423), the client terminal of the presentation-attendance user determines whether the control authority to the virtual object is to be returned based on a user's operation (S1424). When the control authority to the virtual object is not to be returned (NO in S1424), the routine proceeds to S1425. The processes of S1425 to S1429 are the same as the processes of S1324 to S1328 in FIG. 18 and thus description thereof will be omitted. When the process of S1429 ends, the routine proceeds to S1430.

On the other hand, when the control authority to the virtual object is to be returned (YES in S1424), the routine proceeds to S1431. At this time, the client terminal of the presentation-attendance user transmits a deletion request of the control authority to the management server 121 (S1431).

At this time, when the data communication unit 312 receives a deletion request of the control authority, the session managing unit 315 of the management server 121 deletes information of the corresponding user ID from the controller of the corresponding session ID based on the deletion request for the session information (FIG. 5).

After the process of S1429 or S1431 has been performed, the client terminal of the presentation-attendance user transmits an update request of the session information and the anchor information to the management server 121 (S1430). Thereafter, the routines illustrated in FIGS. 22 and 23 end.

When a controller is not the presentation-attendance user (NO in S1423), the client terminal of the presentation-attendance user determines whether the viewpoint position information in the update information of the anchor information (FIG. 4) acquired in S1422 has been updated (S1432). When the viewpoint position information has not been updated (NO in S1432), the routines illustrated in FIGS. 22 and 23 end. On the other hand, when the viewpoint position information has been updated (YES in S1432), the anchor drawing unit 303 re-draws the virtual object based on the update information of the viewpoint position information (S1433). Thereafter, the routines illustrated in FIGS. 22 and 23 end.

Figure 24:
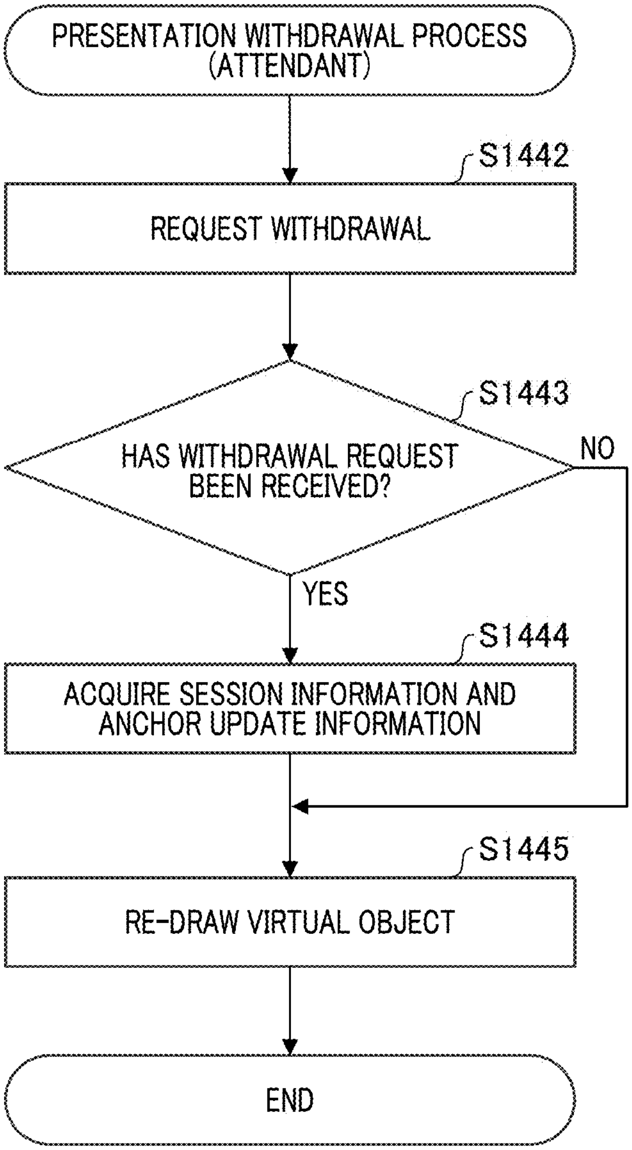
FIG. 24 is a flowchart illustrating an operation example when a presentation-attendance user withdraws from a presentation.

FIG. 24 is a flowchart illustrating an operation example when a presentation-attendance user withdraws from a presentation.

First, the client terminal of the presentation-attendance user designates a session ID of a session which is executed therein and transmits a withdrawal request of the presentation for the session ID to the management server 121 (S1442).

When the data communication unit 312 receives a withdrawal request of the presentation, the management server 121 deletes the corresponding user ID from the attendant of the session information (FIG. 5) via the session managing unit 315 based on the session ID and the user ID included in the withdrawal request. Then, after the corresponding user ID has been deleted from the attendant, the management server 121 returns a processing result of the withdrawal request from the data communication unit 312 to the client terminal which is a request source.

The client terminal of the presentation-attendance user receives the processing result of the withdrawal request and determines whether the withdrawal request has been accepted by the management server 121 (S1443). When the withdrawal request has not been accepted (NO in S1443), the routine proceeds to S1445. In this case, in S1445, the client terminal of the presentation-attendance user draws a virtual object subsequently in the viewpoint synchronized state based on the viewpoint position information of the anchor to which the flag ("0") of the viewpoint synchronization object is given. Thereafter, the routine illustrated in FIG. 24 ends.

On the other hand, when the withdrawal request has been accepted (YES in S1443), the client terminal of the presentation-attendance user acquires update information of the session information and the anchor information from the management server 121 (S1444). Thereafter, the client terminal of the presentation-attendance user re-draws the virtual object of the target anchor based on the viewpoint position information of the acquired anchor information (FIG. 4) (S1445). In the process of S1445, re-drawing of the virtual object is performed regardless of the flag of the viewpoint synchronization object based on the viewpoint position information of the presentation-attendance user.

A virtual object of an anchor which is not displayed during a presentation without the flag of the viewpoint synchronization object is also drawn through the re-drawing of S1445. Through the process of S1445, the virtual object which has been re-drawn from the "viewpoint of the presentation user or the "viewpoint of the controller to which the presentation user has transferred the control authority" during the presentation is drawn from the viewpoint of the withdrawal user of the anchor after presentation withdrawal similarly to before presentation attendance.

By using the aforementioned method, the users of the client terminals 131 to 133 sharing a virtual object in the same session according to the first embodiment can refer to the virtual object from the same viewpoint as the presentation user through the presentation using viewpoint synchronization. By transferring the control authority of the virtual object from the presentation user to a presentation-attendance user in viewpoint synchronization, the presentation-attendance user can control the virtual object from the viewpoint of the presentation user.

Second Embodiment

A virtual object management system according to a second embodiment has the same device configuration as in the first embodiment and is different therefrom in some operations. Accordingly, the same elements in the second embodiment as in the first embodiment will not be repeatedly described.

Referring to FIG. 5 according to the first embodiment, User011, User012, User013, and User014 are present as users sharing a virtual object in the same session Session005. Three users including User011, User012, and User013 attend a presentation, and User014 does not attend the presentation. In this case, a virtual object in the presentation may be operated by User014 who does not attend the presentation. That is, an event in which an operation of the virtual object by a presentation attendant and an operation of the virtual object by a presentation absentee contend may occur.

In the second embodiment, another session is copied from a session in which a presentation is to be started (for example, Session005) at the time of starting of the presentation. Accordingly, in the second embodiment, a contention of the operations on the virtual object between a presentation-attendance user and a presentation-absence user is prevented in the presentation.

FIG. 25 is a diagram illustrating session information at the time of starting of a presentation according to the second embodiment. In the session information illustrated in FIG. 25, an item of copy-source session is added to the session information illustrated in FIG. 5.

In the second embodiment, when presentations of sessions with session IDs of Session004 to Session006 in FIG. 25 are started, the management server 121 copies records thereof and generates Session011 to Session013. At this time, Session004 to Session006 are stored in the items of copy-source session of Session011 to Session013. Accordingly, in the session information illustrated in FIG. 25, a copy-source session is recorded on a copied session thereof in correlation.

User IDs of presentation users having started a presentation are recorded on the session issuers of Session011 to Session013. In the second embodiment, a presentation attendant performs a presentation using the copied sessions of Session011 to Session013. In the second embodiment, since a presentation absentee operates the sessions Session004 to Session006, the presentation attendant and the presentation absentee use different sessions in the presentation.

FIG. 26 is a diagram illustrating anchor information at the time of starting of a presentation according to the second embodiment. In the anchor information illustrated in FIG. 26, an item of copy-source anchor and an item of copying virtual object position information are added to the anchor information illustrated in FIG. 4.

As described above in the first embodiment, a user who requests starting of a presentation selects an anchor which is a presentation object out of anchors correlated with a session ID which is executed at the time of starting of the presentation. In the example illustrated in FIG. 25, it is assumed that presentations of the sessions of Session004 to Session006 are started. Accordingly, in FIG. 26, anchors which are selected as presentation objects by presentation users are selected out of anchors correlated with the sessions.

In FIG. 26, it is assumed that anchor004 is selected as an anchor which is a presentation object in Session004, and anchor006 and anchor007 are selected as an anchor which is a presentation object in Session005. Similarly, it is assumed that anchor008 is selected as an anchor which is a presentation object in Session006.

When this selection has been performed, the management server 121 copies the selected anchors. In FIG. 26, anchor011, anchor012, anchor013, and anchor014 are generated as copied anchors of anchor004, anchor006, anchor007, and anchor008. In each copied anchor, a session ID copied in FIG. 25 is recorded on the item of session ID in FIG. 26. Accordingly, the copied anchors and the copied session IDs are recorded in correlation.

In FIG. 26, an ID of a copy-source anchor is recorded on the item of copy-source anchor in the record of each copied anchor. For example, anchor004, anchor006, anchor007, and anchor008 which are copy sources are recorded on the item of copy-source anchor of anchor011, anchor012, anchor013, and anchor014.

The virtual object position information at an anchor copying timing (at a presentation starting timing) is recorded on the item of the copying virtual object position information in FIG. 26. The copying virtual object position information in FIG. 26 is used at the time of ending of a presentation as will be described later.

FIG. 27 is a diagram illustrating anchor information at the time of ending of a presentation according to the second embodiment. The anchor information illustrated in FIG. 27 is different from that illustrated in FIG. 26 in coordinate values of the virtual object position information in the records of anchor ID of anchor007, anchor012, and anchor013. The viewpoint position information in each record at the time of starting of a presentation and at the time of ending of the presentation may change, but it is assumed that the viewpoint position information in this embodiment does not change for the purpose of simplification.

In FIG. 27, in the record of anchor012, the copying virtual object position information is (13, 8, 26), and the presentation-ending virtual object position information is (22, 3, 14). Accordingly, in anchor012, the virtual object is operated in the presentation thereof and the position of the virtual object is changed. In the second embodiment, the change in position of the virtual object is fed back to the anchor which is a copy source and is reflected therein at the time of ending of the presentation. Whether the change in position of the virtual object is to be fed back may be selected by the presentation user.

At the time of ending of the presentation, when feedback to the anchor which is a copy source is performed, the virtual object position information of anchor006 which is a copy-source anchor of anchor012 is updated with (3, 8, 26) which is the virtual object position information of anchor012. Then, after anchor006 has been updated, the record of anchor012 is deleted.

In FIG. 27, in the record of anchor013, the copying virtual object position information is (16, 10, 19), and the presentation-ending virtual object position information is (20, 02, 20). Accordingly, in anchor013, the virtual object is operated in the presentation thereof and the position of the virtual object is changed.

When feedback to the anchor which is a copy source of anchor013 is performed, the virtual object position information of anchor007 which is a copy-source anchor thereof is changed. However, unlike feedback to anchor006, in anchor007, the virtual object position information (50, 15, 35) of anchor007 is changed from the copying virtual object position information (16, 10, 19) of anchor012. That is, the change in position of the virtual object is performed by both a presentation-attendance user and a presentation-absence user. In this case, when the virtual object position information of anchor012 is fed back to the anchor which is a copy source thereof, a contention in position information with the virtual object position information of anchor007 occurs.

In the case, a position of the virtual object which is finally reflected in anchor007 which is a copy-source anchor can be selected out of anchor013 and anchor007 at the time of ending of the presentation by the presentation user. After anchor007 has been updated, the record of anchor013 is deleted.

In the case, the record of anchor013 may be stored as a new anchor without any change even after the presentation ends without reflecting the position of the virtual object of anchor013 in anchor007. In this case, the record of anchor013 along with the session ID correlated with anchor013 may be left. Alternatively, the record of another anchor in the session ID correlated with anchor013 may be left together and the copied session may be left without any change. When the copied anchor is used as a new anchor, the record of the copying virtual object position information in the cop-source anchor of the corresponding record is deleted.

An operation example from starting of a presentation to ending of the presentation in a client terminal of a presentation user according to the second embodiment will be described below with reference to FIGS. 28 to 30.

Figure 28:
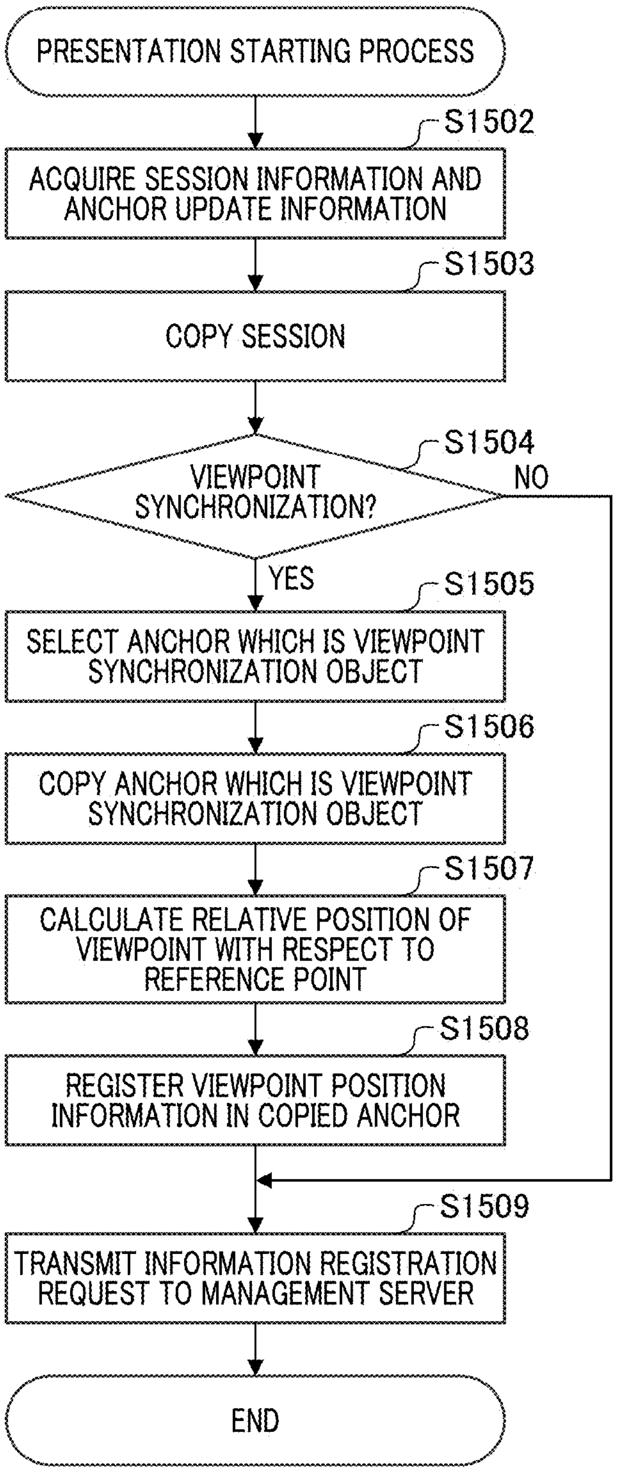
FIG. 28 is a flowchart illustrating an operation example when a presentation user starts a presentation according to the second embodiment.

FIG. 28 is a flowchart illustrating an operation example when a presentation is started by a presentation user according to the second embodiment.

First, a client terminal of the presentation user acquires update information of session information and anchor information (S1502). The client terminal of the presentation user designates a session ID of a session which is currently executed from the session information (FIG. 25) and copies the session ID. The client terminal of the presentation user registers a presenter and a presentation method in the record of the copied session ID (S1503).

The client terminal of the presentation user determines whether the presentation method is viewpoint synchronization (S1504). When the presentation method is viewpoint synchronization (YES in S1504), the routine proceeds to S1505. On the other hand, when the presentation method is not viewpoint synchronization (NO in S1504), it corresponds to a presentation using image sharing and thus the routine in this case proceeds to S1509.

When the presentation method is viewpoint synchronization (YES in S1504), the client terminal of the presentation user selects an anchor which is a viewpoint synchronization object based on an instruction from the presentation user (S1505). The anchor which is a viewpoint synchronization object is selected out of anchors correlated with the session ID of the session which is currently executed in the anchor information (FIG. 26).

Then, the client terminal of the presentation user copies the anchor which is a viewpoint synchronization object selected in S1505 (S1506). At this time, the client terminal of the presentation user registers the copied virtual object position information in the time of copying virtual object position information in the anchor information illustrated in FIG. 26.

The client terminal of the presentation user calculates a relative position of the viewpoint of the presentation user with respect to a "reference point included in the feature quantity of an anchor" for each copied anchor (S1507). Then, the client terminal of the presentation user performs a process of registering the calculated relative position in the viewpoint position information of the copied anchor in the anchor information (FIG. 26) (S1508).

Thereafter, the client terminal of the presentation user transmits a registration request of the copied session information and the copied anchor information to the management server 121 (S1509). Thereafter, the routine illustrated in FIG. 28 ends.

Figure 29:
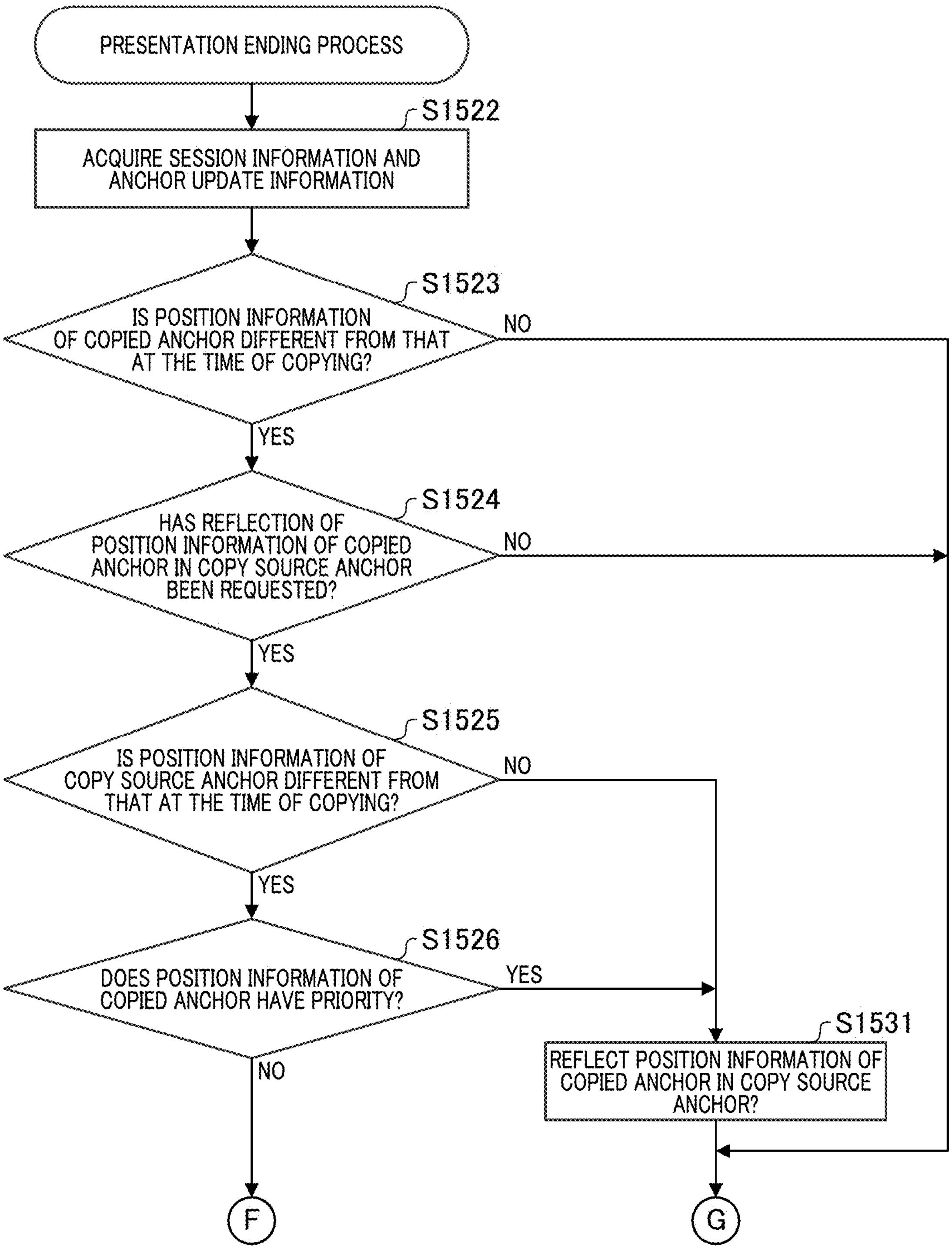
FIG. 29 is a flowchart illustrating an operation example when a presentation user ends a presentation according to the second embodiment.
Figure 30:
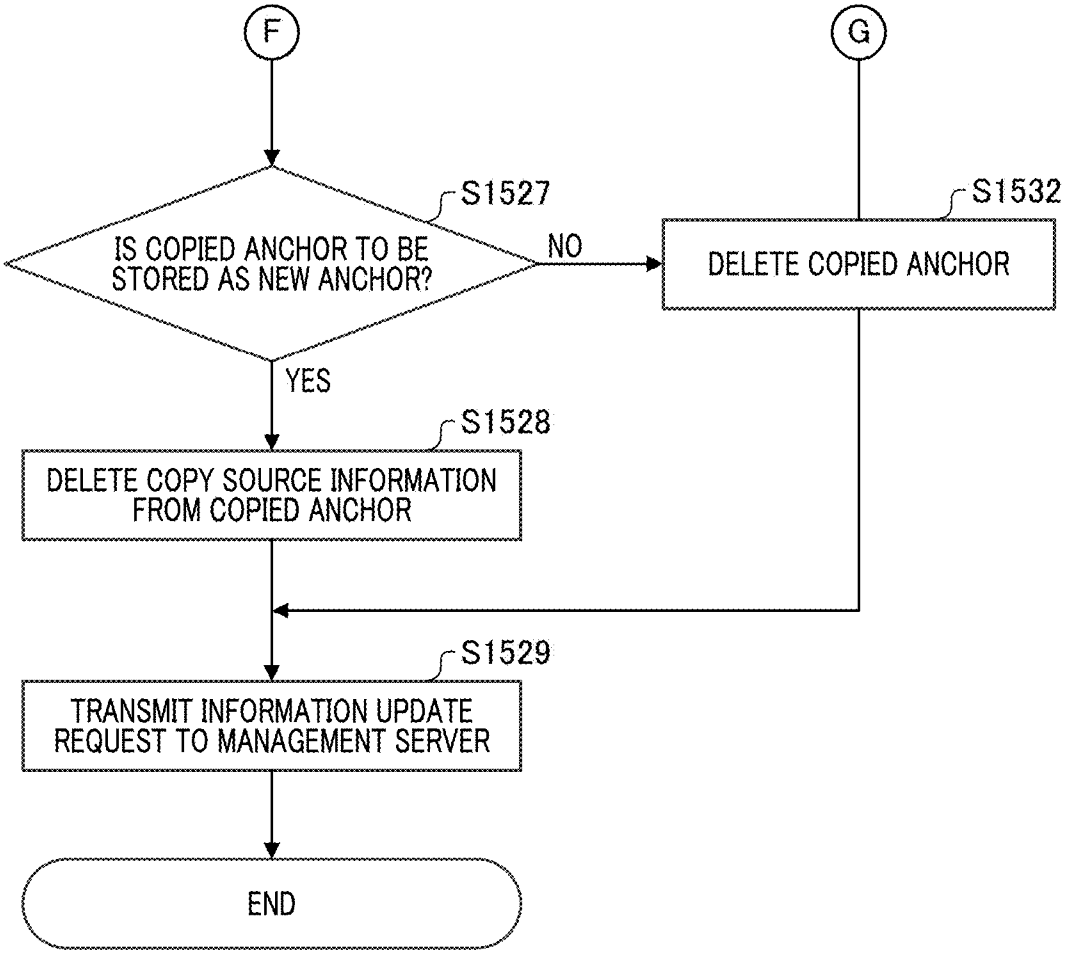
FIG. 30 is a flowchart subsequent to FIG. 29.

FIGS. 29 and 30 are flowcharts illustrating an operation example when a presentation is ended by a presentation user according to the second embodiment.

First, the client terminal of the presentation user acquires update information of the session information and the anchor information (S1522).

The client terminal of the presentation user determines whether there is a difference between the virtual object position information and the copying virtual object position information for the each record of the copied anchors included in the anchor information (FIG. 27) (S1523). When there is a difference therebetween (YES in S1523), the routine proceeds to S1524. On the other hand, when there is no difference therebetween (NO in S1523), the routine proceeds to S1532.

The client terminal of the presentation user determines whether the "virtual object position information of the copied anchor" is set to be reflected in the "virtual object position information of the copy-source anchor" at the time of ending of the presentation (S1524). When the reflection is to be performed (YES in S1524), the routine proceeds to S1525. On the other hand, when the reflection is not to be performed (NO in S1524), the routine proceeds to S1532.

The client terminal of the presentation user refers to the virtual object position information of the copy-source anchor. Then, the client terminal of the presentation user determines whether there is a difference between the "virtual object position information of the copy-source anchor" and the "copying virtual object position information of the copied anchor" (S1525). When there is a difference therebetween (YES in S1525), the routine proceeds to S1526. On the other hand, when there is no difference therebetween (NO in S1525), the routine proceeds to S1531.

The client terminal of the presentation user determines whether the "virtual object position information of the copied anchor" is set to be reflected in the copy-source anchor (S1526). In determining whether priority is to be given to the viewpoint position information of the copied anchor (S1526), a user selection screen (not illustrated) may be displayed on the display unit 206 of the client terminal and the determination may be performed based on the presentation user's selection. When the setting is performed (YES in S1526), the routine proceeds to S1531. On the other hand, when the "virtual object position information of the copy-source anchor" has higher priority than the "virtual object position information of the copied anchor" (NO in S1526), the routine proceeds to S1527.

When the "virtual object position information of the copy-source anchor" has higher priority (NO in S1526), the client terminal of the presentation user determines whether the copied anchor is to be stored as a new anchor (S1527). In determining whether the copied anchor is to be stored in a new anchor (S1527), a user selection screen (not illustrated) may be displayed on the display unit 206 of the client terminal and the determination may be performed based on the presentation user's selection. When the copied anchor is not to be stored as a new anchor (NO in S1527), the routine proceeds to S1532.

On the other hand, when the copied anchor is to be stored as a new anchor (YES in S1527), the routine proceeds to S1528. At this time, the client terminal of the presentation user deletes information of the copy-source anchor and the copying virtual object position information from the record of the copied anchor in the anchor information (FIG. 27) (S1528). In the process of S1528, the copy-source session in the session information (FIG. 25) is also deleted from the record of the session ID correlated with the copied anchor. In this way, the record is updated such that the copied record is stored as a new record. Thereafter, the routine proceeds to S1529.

When the determination result of S1525 is NO or the determination result of S1526 is YES, the client terminal of the presentation user updates the "virtual object position information of the copy-source anchor" with the "virtual object position information of the copied anchor" (S1531). Thereafter, the routine proceeds to S1532.

When the determination result of S1523 is NO, the determination result of S1524 is NO, or the determination result of S1527 is NO or after the process of S1531 has been performed, the client terminal of the presenter deletes the record of the copied anchor from the anchor information (FIG. 27) (S1532). In the process of S1532, when the session ID correlated with the copied anchor is not correlated with another anchor, the session ID is also deleted. The session ID deleted in S1532 is a session ID copied in S1503 at the time of starting of the presentation.

Then, after the process of S1528 or S1532 has been performed, the client terminal of the presentation user transmits an update request of the session information and the anchor information to the management server 121 (S1529). Thereafter, the routines illustrated in FIGS. 29 and 30 end.

By using the aforementioned method, it is possible to prevent a contention in operation of a virtual object between a presentation attendant and a presentation absentee in the client terminals 131 to 133 sharing the virtual object in the same session according to the second embodiment.

Third Embodiment

In the first embodiment and the second embodiment, one of users sharing a virtual object in the same session serves as a presenter, and a presenter viewpoint is synchronized at the time of starting of a presentation. On the other hand, in schoolwork, training lectures, or the like, it is conceivable that cooperative work be performed while performing viewpoint synchronization of a virtual object for each of a plurality of groups.

In a third embodiment, an operation example when other sessions corresponding to the number of groups are copied from a session in which group work is to be performed and cooperative work is performed while performing viewpoint synchronization for each group will be described. In the following description, differences from the first embodiment and the second embodiment will be described.

Table 2 shows group information which is used in grouping according to the third embodiment. The group information in Table 2 is stored, for example, in the user managing unit 313 of the management server 121.

TABLE 2

| Group information | | |
|---|---|---|
| Group ID | Representative | Group member |
| Group001 | User101 | User101, User102, User103 |
| Group002 | User111 | User111, User112, User113 |
| Group003 | User121 | User121, User122, User123 |
| . | . | . |
| . | . | . |
| . | . | . |

The item of group ID in Table 2 records an ID for uniquely identifying a group. The item of group member in Table 2 records one or more user IDs of constituent members of the corresponding group. The item of representative in Table 2 records a user ID of a representative of the corresponding group. A user ID of a user selected as a representative out of the user IDs recorded on the item of group member is recorded on the item of representative.

FIG. 31 is a diagram illustrating session information at the time of grouping. The items in the session information illustrated in FIG. 31 are the same as those of the session information (FIG. 25) according to the second embodiment. In the third embodiment, sessions corresponding to the number of groups are copied from the session of the session ID to be grouped at the time of grouping.

In FIG. 31, it is assumed that a session ID Session007 is to be grouped and a record thereof is copied for three groups of Group001, Group002, and Group003. Accordingly, three sessions of Session80, Session81, and Session82 in FIG. 31 are copied from Session007. In FIG. 31, a group ID can be designated as an example of a login user and an attendant, but user IDs of members included in a group may be designated. In this way, it is possible to use different sessions in each group by copying a session for each group.

FIG. 32 is a diagram illustrating anchor information at the time of starting of grouping. The items in the anchor information illustrated in FIG. 32 are the same as those in the anchor information (FIG. 26 or 27) according to the second embodiment.

At the time of starting of grouping, a target anchor which is subjected to viewpoint synchronization by grouping is selected out of anchors correlated with a session ID under execution by a presentation user instructing to start grouping in viewpoint synchronization. In the example illustrated in FIG. 31, the session Session007 is grouped and is subjected to viewpoint synchronization. Accordingly, in FIG. 32, an anchor which is to be presented by the presentation user out of anchors correlated with Session007.

In FIG. 32, for the purpose of simplification, it is assumed that only one anchor (anchor009) is correlated with Session007 and the anchor is selected as a viewpoint synchronization object. Then, anchor009 is copied to anchor101, anchor102, and anchor103 correlated with Session80, Session81, and Session82 copied for each group.

When an anchor is copied in the case, a flag ("0") is recorded on the item of viewpoint synchronization object in the record of the copied anchor and Session009 is recorded on the item of copy-source anchor. The virtual object position information at the time of copying is recorded on the copying virtual object position information.

FIG. 33 is a diagram illustrating anchor information at the time of ending of grouping. The items of the anchor information illustrated in FIG. 33 are the same as the items of the anchor information illustrated in FIG. 32.

In FIG. 33, coordinate values of the virtual object position information are different from those of the anchor information illustrated in FIG. 32 in the records of an anchor ID of anchor102 and anchor103. The viewpoint position information in the records may change at the time of starting of grouping and at the time of ending of grouping, but it is assumed that the viewpoint position information does not change in this embodiment for the purpose of simplification.

In the records of anchor102 and anchor103 in FIG. 33, all the copying virtual object position information is (79, 38, 100), and the virtual object position information at the time of ending of grouping is (54, 12, 11) and (52, 11, 28). Accordingly, in anchor102 and anchor103, the virtual object is operated in the meantime of grouping and the position of the virtual object is changed.

In the third embodiment, a change in position of the virtual object which is performed in a certain group can be fed back to the copy-source anchor and reflected therein at the time of ending of grouping.

What copied anchor is used to feed back the virtual object position information to the copy-source anchor at the time of ending of grouping may be able to be selected by a user instructing to group or a representative of each group. For example, it is assumed in FIG. 33 that which of anchor102 and anchor103 is used to feed back the virtual object position information to anchor009 which is a copy source is selected by a grouping-instructing user at the time of ending of grouping. When anchor102 is selected, the virtual object position information of anchor009 is updated with (54, 12, 11). On the other hand, when anchor103 is selected, the virtual object position information of anchor009 is updated with (52, 11, 28).

In the example illustrated in FIG. 33, it is assumed that the virtual object position information of the copy-source anchor matches the copying virtual object position information of the copied anchor and the position of the virtual object is not changed. When the virtual object position information of the copy-source anchor is updated, anchor009 which is the copy-source anchor may be able to be selected in selecting a copied anchor of which the virtual object position information is to be fed back at the time of ending of grouping. In addition, one or more of a plurality of anchors may be stored as a new anchor. In this case, the copy-source anchor and the copying virtual object position information are deleted from the record in which the copied anchor is left as a new anchor.

An operation example from starting of grouping to ending of grouping in a client terminal of a grouping-instructing user instructing to group according to the third embodiment will be described below with reference to FIGS. 34 to 36.

Figure 34:
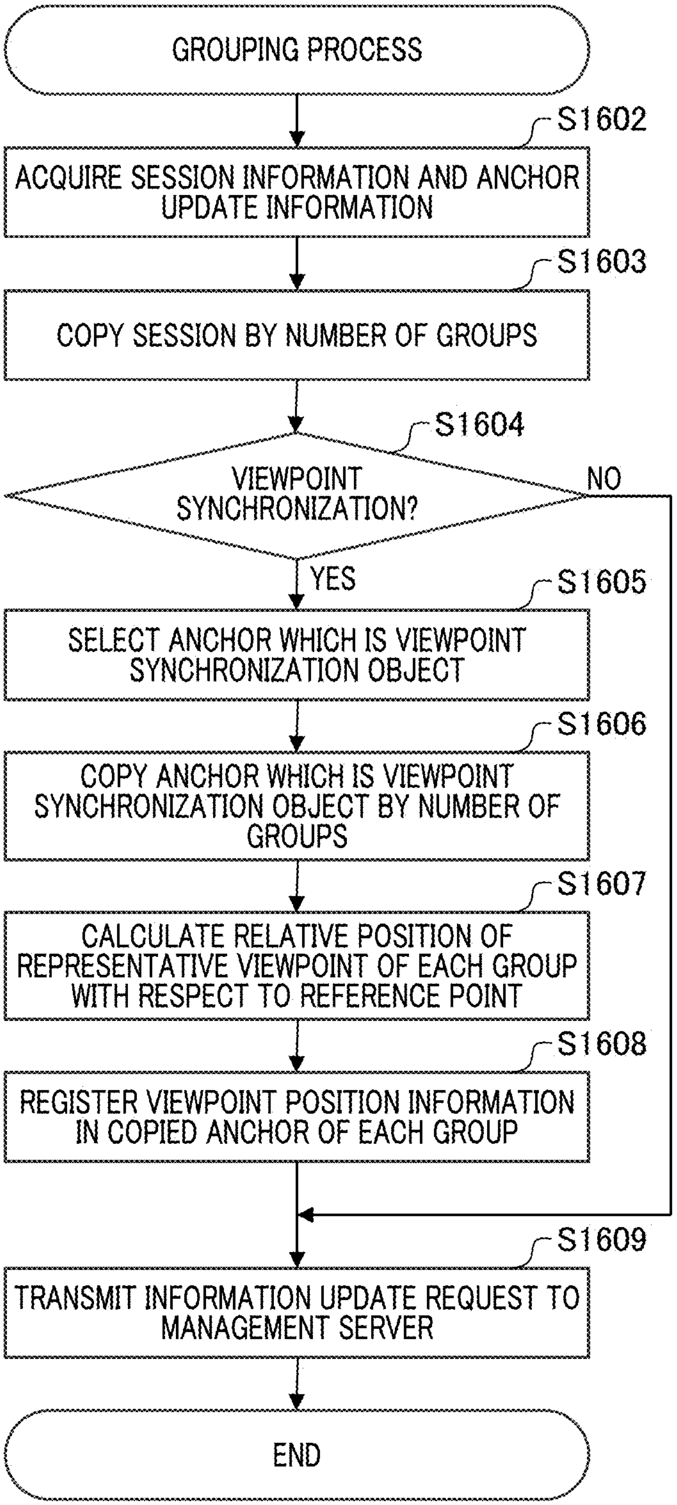
FIG. 34 is a flowchart illustrating an operation example when a grouping-instructing user starts grouping according to a third embodiment.

FIG. 34 is a flowchart illustrating an operation example when grouping is started by a grouping-instructing user according to the third embodiment.

First, a client terminal of the grouping-instructing user acquires update information of session information and anchor information (S1602).

Then, the client terminal of the grouping-instructing user designates a session ID of a session which is currently executed from the session information (FIG. 31) based on settings of the group information (Table 2). Then, the client terminal of the grouping-instructing user copies the session ID by the number of groups in the group information (S1603).

At this time, in the record of the copied session ID, a group ID is recorded on the item of login user and attendant, and a user ID of a group representative is recorded on the item of presenter. As the presentation method, the grouping-instructing user can designate one of image sharing and viewpoint synchronization at the time of grouping.

The client terminal of the grouping-instructing user determines whether the presentation method is viewpoint synchronization (S1604). When the presentation method is viewpoint synchronization (YES in S1604), the routine proceeds to S1605. On the other hand, when the presentation method is not viewpoint synchronization (NO in S1604), it corresponds to a presentation using image sharing and the routine in this case proceeds to S1609.

When the presentation method is viewpoint synchronization (YES in S1604), the client terminal of the grouping-instructing user selects an anchor which is a viewpoint synchronization object based on an instruction from the grouping-instructing user (S1605). The anchor which is a viewpoint synchronization object is selected out of anchors correlated with the session ID of the session which is currently executed in the anchor information (FIG. 32).

Then, the client terminal of the grouping-instructing user copies the anchor which is a viewpoint synchronization object selected in S1605 by the number of groups (S1606). At this time, the client terminal of the grouping-instructing user registers the copied virtual object position information in the item of copying virtual object position information in the anchor information illustrated in FIG. 32.

The client terminal of the grouping-instructing user calculates a relative position of a representative viewpoint of each group with respect to the "reference point included in the feature quantity of the anchor" for the copied anchor (S1607). Then, the client terminal of the grouping-instructing user performs a process of registering the calculated relative positions in the viewpoint position information of the copied anchors in the anchor information (FIG. 32) (S1608).

Thereafter, the client terminal of the grouping-instructing user transmits a registration request of the copied session information and the copied anchor information to the management server 121 (S1609). Thereafter, the routine illustrated in FIG. 34 ends.

Figure 35:
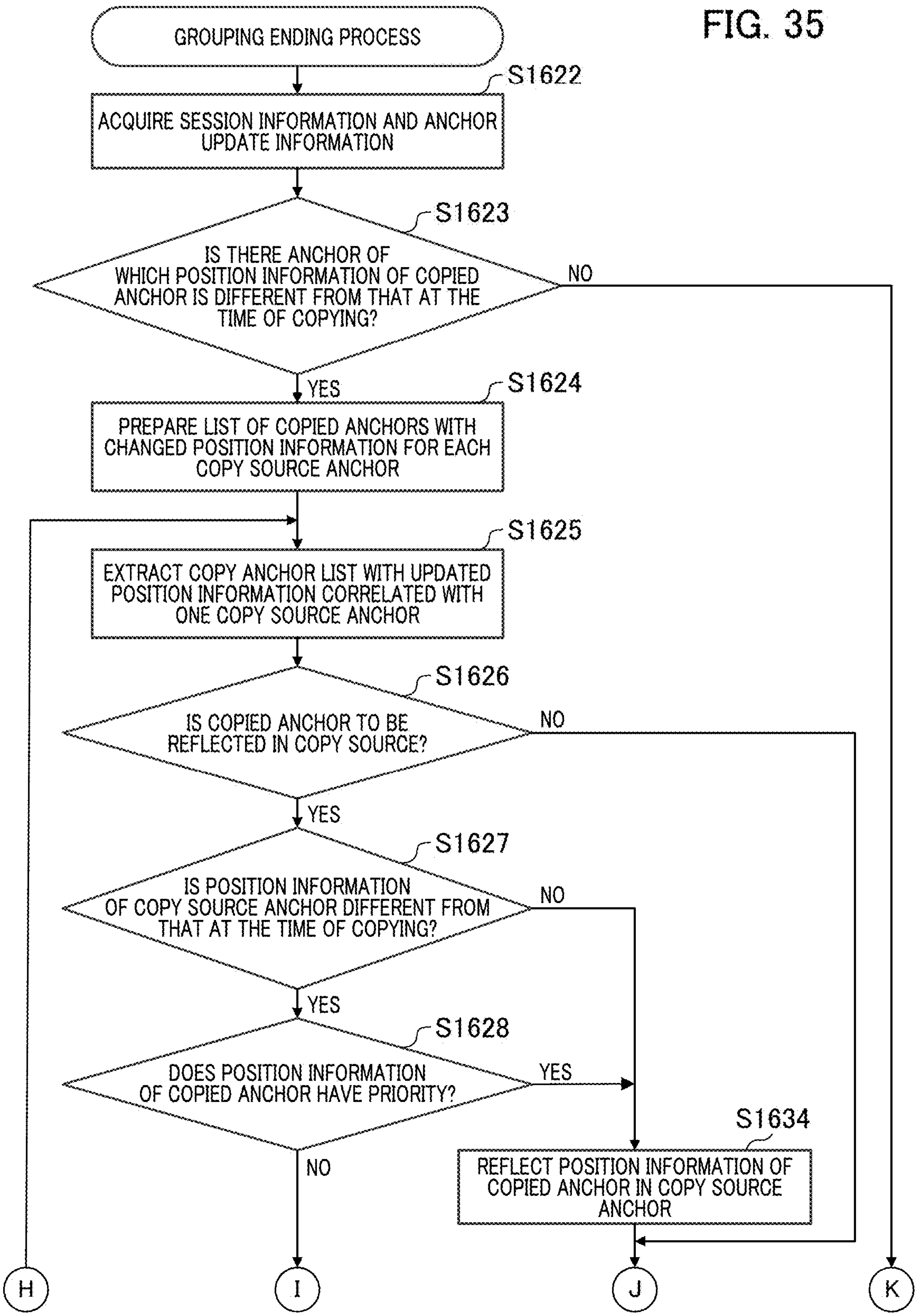
FIG. 35 is a flowchart illustrating an operation example when a grouping-instructing user ends grouping according to the third embodiment.
Figure 36:
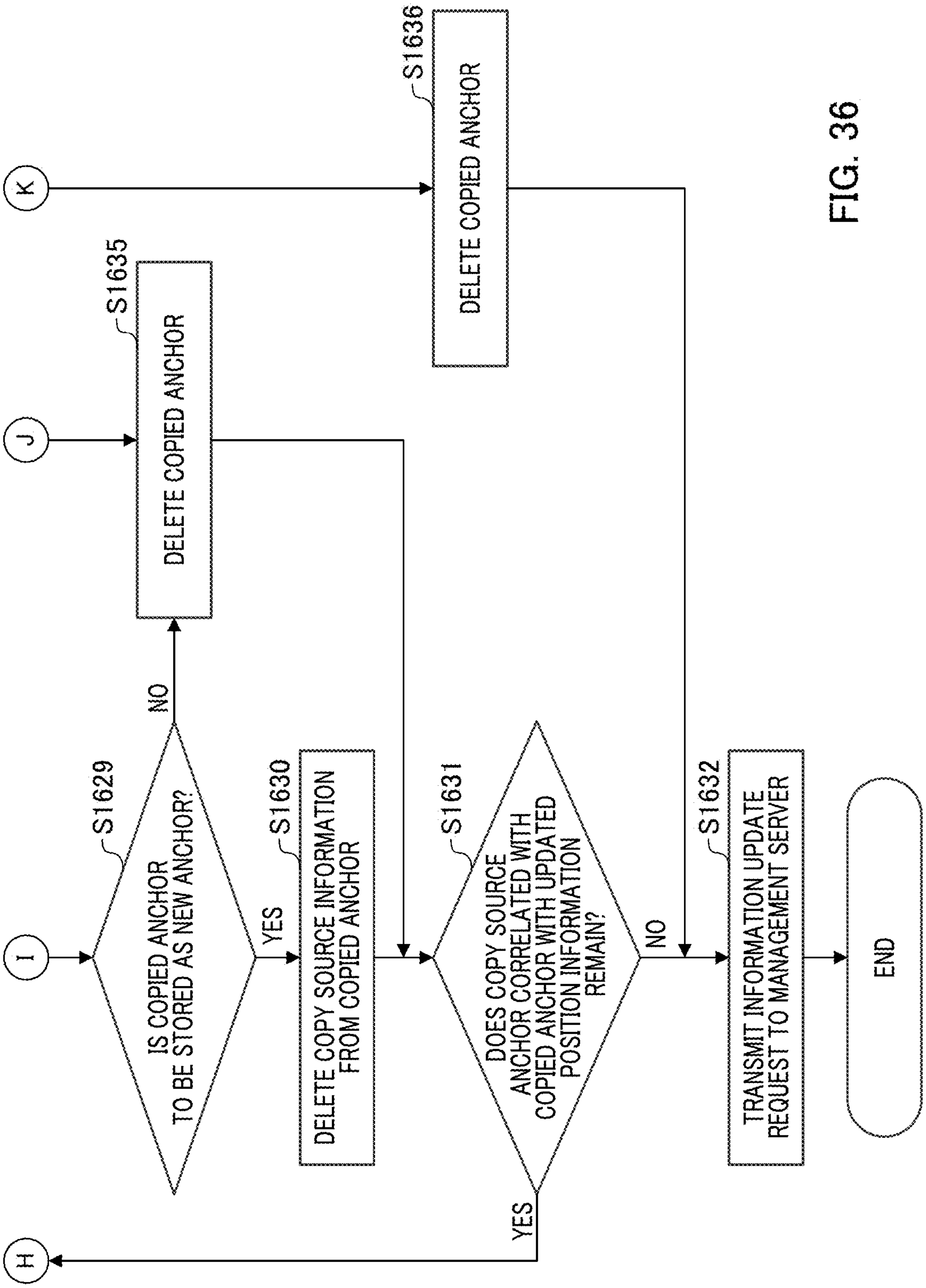
FIG. 36 is a flowchart subsequent to FIG. 35.

FIGS. 35 and 36 are flowcharts illustrating an operation example when grouping is ended by a grouping-instructing user according to the third embodiment.

First, the client terminal of the grouping-instructing user acquires update information of the session information and the anchor information (S1622).

The client terminal of the grouping-instructing user determines whether there is a difference between the virtual object position information and the copying virtual object position information in the record of the copied anchor included in the anchor information (FIG. 33) (S1623). When a copied anchor in which there is a difference therebetween (hereinafter also referred to as a position-information-updated copied anchor) is present (YES in S1623), the routine proceeds to S1624.

On the other hand, when there is no difference therebetween and a position-information-updated copied anchor is not present (NO in S1623), the routine proceeds to S1636. In this case, the client terminal of the grouping-instructing user deletes all the copied anchors of which grouping ends (S1636). Thereafter, the routine proceeds to S1632.

The client terminal of the grouping-instructing user prepares a list of position-information-updated copied anchors for each copy-source anchor in the anchor information (FIG. 33) and stores the list information of the position-information-updated copied anchors (S1624).

Thereafter, the client terminal of the grouping-instructing user extracts the list of position-information-updated copied anchors correlated with one copy-source anchor (S1625).

Then, the client terminal of the grouping-instructing user determines whether the "virtual object position information of one copied anchor" is to be reflected in the "virtual object position information of the copy source" at the time of ending of grouping (S1626). When the reflection is to be performed (YES in S1626), the routine proceeds to S1627. At this time, the virtual object position information of the copied anchor selected by the grouping-instructing user is reflected in the grouping-instructing user of the copy source. On the other hand, when the reflection is not to be performed (NO in S1626), the routine proceeds to S1635.

The client terminal of the grouping-instructing user refers to the virtual object position information of the copy-source anchor. Then, the client terminal of the grouping-instructing user determines whether there is a difference between the "virtual object position information of the copy-source anchor" and the "copying virtual object position information of the copied anchor" (S1627). When there is a difference therebetween (YES in S1627), the routine proceeds to S1628. On the other hand, when there is no difference (NO in S1627), the routine proceeds to S1634.

The client terminal of the grouping-instructing user determines whether the "virtual object position information of the copied anchor" is to be reflected in the copy-source anchor (S1628). In determining whether priority is given to the viewpoint position information of the copied anchor (S1628), a user selection screen (not illustrated) may be displayed on the display unit 206 of the client terminal and the determination may be performed based on the grouping-instructing user's selection. When the reflection is to be performed (YES in S1628), the routine proceeds to S1634. On the other hand, when the "virtual object position information of the copy-source anchor" has higher priority than the "virtual object position information of the copied anchor" (NO in S1628), the routine proceeds to S1629.

When the "virtual object position information of the copy-source anchor" has higher priority (NO in S1628), the client terminal of the grouping-instructing user determines whether the copied anchor is to be stored as a new anchor (S1629). In determining whether the copied anchor is to be stored as a new anchor (S1629), a user selection screen (not illustrated) may be displayed on the display unit 206 of the client terminal and the determination may be performed based on the grouping-instructing user's selection. When the copied anchor is not to be stored as a new anchor (NO in S1629), the routine proceeds to S1635.

On the other hand, when the copied anchor is to be stored as a new anchor (YES in S1629), the routine proceeds to S1630. At this time, the client terminal of the grouping-instructing user deletes information of the copy-source anchor and the copying virtual object position information from the record of the copied anchor in the anchor information (FIG. 33) (S1630). In the process of S1630, the copy-source session in the session information (FIG. 31) is also deleted from the record of the session ID correlated with the copied anchor. In this way, the records are updated such that the copied record is stored as a new record. Thereafter, the routine proceeds to S1631.

When the determination of S1627 is NO or the determination result of S1628 is YES, the client terminal of the grouping-instructing user updates the "virtual object position information of the copy-source anchor" with the virtual object position information of the copied anchor" (S1634). Thereafter, the routine proceeds to S1635.

When the determination result of S1623 is NO, the determination result of S1626 is NO, or the determination result of S1629 is NO or after the process of S1634 has been performed, the client terminal of the grouping-instructing user deletes the records of all the copied anchors correlated with the copy-source anchor from the anchor information (FIG. 33) (S1635). Thereafter, the routine proceeds to S1631.

After the process of S1630 or S1635 has been performed, the client terminal of the grouping-instructing user determines whether a copy-source anchor correlated with the position-information-updated copied anchor remains in the list information prepared in S1624 (S1631). When such a copy-source anchor remains (YES in S1631), the routine returns to S1625, and the aforementioned processes are repeated.

On the other hand, when such a copy-source anchor does not remain (NO in S1631) or after the process of S1636 has been performed, the client terminal of the grouping-instructing user transmits an update request of the session information and the anchor information to the management server 121 (S1632). Thereafter, the routines illustrated in FIGS. 35 and 36 end.

By using the aforementioned method, according to the third embodiment, it is possible to enable a presentation using viewpoint synchronization for each group when cooperative works is performed using grouping and to prevent a contention in operation between the groups.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)®), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-120790, filed Jul. 28, 2022 which is hereby incorporated by reference herein in its entirety.

What is claimed is:

1. A system (a) including (i) a plurality of terminals and (ii) a server connected to the plurality of terminals via a network and (b) providing a virtual object to at least one terminal of the plurality of terminals, wherein the server comprises: (A) one or more memories storing instructions; and (B) one or more processors executing the stored instructions, thereby causing the server to:

(1) manage anchor information by associating (a) a feature quantity indicating features of the real world acquired from a captured image of surroundings of a terminal of the plurality of terminals, (b) position information of the virtual object calculated from the feature quantity, and (c) data of the virtual object;

(2) provide the anchor information, in a case where (a) a first terminal among the plurality of terminals is used by a first user, (b) a second terminal among the plurality of terminals is used by a second user, and (c) the anchor information related to the first terminal is managed, to the second terminal in response to an acquisition request for the anchor information from the second terminal, thereby allowing the second terminal to project the virtual object based on the position information of the virtual object in the provided anchor information in response to detection, in a captured image of surroundings of the second terminal, of a feature quantity matching the feature quantity in the provided anchor information; and (3) register, in the anchor information, (a) first viewpoint information indicating a viewpoint at the first terminal and (b) second viewpoint information indicating a viewpoint at the second terminal in response to receiving an instruction from the first terminal to synchronize the respective viewpoints to the virtual object projected at the first terminal and the second terminal, and wherein the second terminal comprises: (A) one or more memories storing instructions; and (B) one or more processors executing the stored instructions, thereby causing the second terminal to perform control to switch between the projection of the virtual object using the first viewpoint information and the projection of the virtual object using the second viewpoint information by referring to the anchor information on the basis of the instruction input to the first terminal by the first user.

2. The system according to claim 1, wherein control for receiving designation of the virtual object to be projected using the first viewpoint information from the first user is performed in the first terminal.

3. The system according to claim 2, wherein the virtual object designated by the first terminal is a first virtual object projected by the first terminal using the first viewpoint information and by the second terminal using the second viewpoint information, wherein execution of the stored instructions by the one or more processors of the second terminal further causes the second terminal to control so as not to display a second virtual object, which is different from the first virtual object, when the first virtual object is being projected, and wherein the second virtual object was projected before the provided anchor information was acquired by the second terminal.

4. The system according to claim 1, wherein control for transferring control authority to operate the projected virtual object to the second terminal is performed in the first terminal.

5. The system according to claim 4, wherein execution of the stored instructions by the one or more processors of the second terminal further causes the second terminal to (1) calculate a position of the virtual object in response to change of the position of the virtual object by an operation of the second user and (2) update the second viewpoint information in the anchor information based on a result of the calculation, when transfer of the control authority from the first terminal to the second terminal is performed in the second terminal.

6. The system according to claim 4, wherein the control authority is transferred from the first terminal to the second terminal at a timing at which the second user performs an operation with the second terminal to touch the virtual object projected using the first viewpoint information.

7. The system according to claim 1, wherein the feature quantity includes a reference point that indicates a reference position for the terminal to overlap and display the virtual object on an image in the real world, wherein the first viewpoint information is specified as coordinates relative to the reference point included in the feature quantity acquired from the captured image of the surroundings of the first terminal, and wherein the second viewpoint information is specified as coordinates relative to the reference point included in the feature quantity acquired from the captured image of the surroundings of the second terminal.

8. The system according to claim 1, wherein the feature quantity indicates features of a printed marker.

9. A method that is performed by a system, the system (a) including (i) a plurality of terminals and (ii) a server connected to the plurality of terminals via a network and (b) providing a virtual object to at least one terminal of the plurality of terminals, the method comprising:

managing anchor information by associating (a) a feature quantity indicating features of the real world acquired from a captured image of the surroundings of the terminal, (b) position information of the virtual object calculated from the feature quantity, and (c) data of the virtual object, wherein the managing is performed by the server;

providing the anchor information, in a case where (a) a first terminal among the plurality of terminals is used by a first user, (b) a second terminal among the plurality of terminals is used by a second user, and (c) the anchor information related to the first terminal is managed, to the second terminal in response to an acquisition request for the anchor information from the second terminal, thereby allowing the second terminal to project the virtual object based on the position information of the virtual object in the provided anchor information in response to detection, in a captured image of surroundings of the second terminal, of a feature quantity matching the feature quantity in the provided anchor information, wherein the providing is performed by the server; and registering, in the anchor information, (a) first viewpoint information indicating a viewpoint at the first terminal and (b) second viewpoint information indicating a viewpoint at the second terminal, in response to receiving an instruction from the first terminal to synchronize the respective viewpoints to the virtual object projected at the first terminal and the second terminal, wherein the registering is performed by the server, wherein the second terminal performs control to switch between the projection of the virtual object using the first viewpoint information and the projection of the virtual object using the second viewpoint information by referring to the anchor information on the basis of the instruction input to the first terminal by the first user.

* * * * *